(12) United States Patent
Richardson

(10) Patent No.: US 12,059,930 B1
(45) Date of Patent: Aug. 13, 2024

(54) SYSTEM AND METHOD FOR AUTOMATIC PRESSURE MANAGEMENT

(71) Applicant: Aperia Technologies, Inc., Burlingame, CA (US)

(72) Inventor: Brandon Richardson, Burlingame, CA (US)

(73) Assignee: Aperia Technologies, Inc., Hayward, CA (US)

( * ) Notice: Subject to any disclaimer, the term of this patent is extended or adjusted under 35 U.S.C. 154(b) by 58 days.

(21) Appl. No.: 17/388,340

(22) Filed: Jul. 29, 2021

Related U.S. Application Data

(63) Continuation of application No. 16/051,225, filed on Jul. 31, 2018, now abandoned.

(60) Provisional application No. 62/588,149, filed on Nov. 17, 2017, provisional application No. 62/538,981, filed on Jul. 31, 2017.

(51) Int. Cl.
| | |
|---|---|
| *B60C 23/00* | (2006.01) |
| *B60C 23/10* | (2006.01) |
| *F04B 17/04* | (2006.01) |
| *F04B 35/01* | (2006.01) |
| *F16F 15/14* | (2006.01) |
| *G05D 7/06* | (2006.01) |
| *H02K 7/18* | (2006.01) |

(52) U.S. Cl.
CPC .......... *B60C 23/004* (2013.01); *B60C 23/003* (2013.01); *B60C 23/10* (2013.01); *F04B 17/04* (2013.01); *F04B 35/01* (2013.01); *F16F 15/1485* (2013.01); *G05D 7/0623* (2013.01); *H02K 7/1846* (2013.01)

(58) Field of Classification Search
CPC . H02K 7/1846; G05D 7/0623; F16F 15/1485; F04B 35/01; F04B 17/04; B60C 23/004; B60C 23/003; B60C 23/10
See application file for complete search history.

(56) References Cited

U.S. PATENT DOCUMENTS

| | | | |
|---|---|---|---|
| 3,380,021 A * | 4/1968 | Dudar | H01H 37/54 340/521 |
| 5,325,902 A | 7/1994 | Loewe et al. | |
| 5,452,753 A | 9/1995 | Olney | |
| 5,505,080 A | 4/1996 | McGhee | |
| 6,742,386 B1 | 6/2004 | Larson | |
| 8,534,335 B2 | 9/2013 | Benedict | |
| 8,794,280 B2 | 8/2014 | Flory et al. | |
| 9,381,780 B2 | 7/2016 | Hinque | |
| 9,428,016 B2 | 8/2016 | Keeney et al. | |
| 9,434,218 B2 | 9/2016 | Root | |
| 9,597,932 B2 | 3/2017 | Dieckmann et al. | |
| 9,682,599 B1 | 6/2017 | Hinque et al. | |
| 9,789,739 B1 | 10/2017 | Hennig | |
| 10,052,834 B2 | 8/2018 | Losey | |
| 10,137,745 B2 | 11/2018 | McClellan | |
| 10,166,821 B2 | 1/2019 | Hennig | |

(Continued)

FOREIGN PATENT DOCUMENTS

| | | |
|---|---|---|
| BR | 102012023751 A2 | 8/2014 |
| BR | 112015017312 A2 | 7/2017 |

(Continued)

*Primary Examiner* — Scott A Browne
(74) *Attorney, Agent, or Firm* — Jeffrey Schox; Diana Lin

(57) ABSTRACT

A pressure management system for a tire assembly on a vehicle including: a housing unit, a pump, and a power interface.

20 Claims, 9 Drawing Sheets

(56) References Cited

U.S. PATENT DOCUMENTS

| | | |
|---|---|---|
| 10,183,535 B1 | 1/2019 | Chemali |
| 10,189,320 B2 | 1/2019 | Hinque |
| 10,239,364 B2 | 3/2019 | Hennig |
| 10,358,005 B2 | 7/2019 | McClellan |
| 10,422,660 B2 | 9/2019 | Creech et al. |
| 10,513,156 B2 | 12/2019 | Hrabal |
| 10,576,794 B2 | 3/2020 | Lee |
| 10,625,544 B2 | 4/2020 | Balistreri |
| 10,730,355 B2 | 8/2020 | Grosse-Vehne et al. |
| 11,199,186 B2 | 12/2021 | Slesinski et al. |
| 11,209,289 B2 | 12/2021 | Creech et al. |
| 11,353,137 B2 | 6/2022 | Scopesi |
| 11,370,189 B2 | 6/2022 | Tsiberidis |
| 2012/0073716 A1 | 3/2012 | Benedict |
| 2013/0068361 A1 | 3/2013 | Flory et al. |
| 2014/0102621 A1 | 4/2014 | Losey |
| 2015/0059950 A1 | 3/2015 | Hinque |
| 2015/0101723 A1 | 4/2015 | Keeney et al. |
| 2015/0239309 A1 | 8/2015 | Root |
| 2015/0360522 A1 | 12/2015 | Dieckmann et al. |
| 2016/0288591 A1 | 10/2016 | Becker |
| 2017/0015147 A1 | 1/2017 | McClellan |
| 2017/0015156 A1 | 1/2017 | McClellan |
| 2017/0166017 A1 | 6/2017 | Hinque |
| 2017/0166018 A1 | 6/2017 | Hinque et al. |
| 2018/0001718 A1 | 1/2018 | Hennig |
| 2018/0022170 A1 | 1/2018 | Hennig |
| 2018/0065429 A1 | 3/2018 | Richardson |
| 2018/0072112 A1 | 3/2018 | Lee |
| 2018/0231395 A1 | 8/2018 | Creech et al. |
| 2018/0250991 A1 | 9/2018 | Hrabal |
| 2018/0319227 A1 | 11/2018 | Abdel-Baset et al. |
| 2018/0326932 A1 | 11/2018 | Chemali |
| 2019/0023085 A1 | 1/2019 | Chemali |
| 2019/0023091 A1 * | 1/2019 | Spindler ............... B29C 73/025 |
| 2019/0063414 A1 | 2/2019 | Slesinski et al. |
| 2019/0118593 A1 | 4/2019 | Hrabal |
| 2019/0126693 A1 | 5/2019 | Balistreri |
| 2019/0271407 A1 | 9/2019 | Scopesi |
| 2019/0368897 A1 | 12/2019 | Creech et al. |
| 2020/0070450 A1 | 3/2020 | Tsiberidis |
| 2020/0130435 A1 | 4/2020 | Root et al. |
| 2020/0130436 A1 | 4/2020 | Root et al. |
| 2020/0130437 A1 | 4/2020 | Root et al. |
| 2020/0134942 A1 | 4/2020 | Root et al. |
| 2022/0161611 A1 | 5/2022 | Hrabal |

FOREIGN PATENT DOCUMENTS

| | | | |
|---|---|---|---|
| CN | 102963222 A | 3/2013 | |
| CN | 103009938 A | 4/2013 | |
| CN | 103171160 A | 6/2013 | |
| CN | 103770579 A | 5/2014 | |
| CN | 103879244 A | 6/2014 | |
| CN | 102015334 B | 10/2014 | |
| CN | 102963222 B | 5/2015 | |
| CN | 102963221 B | 6/2015 | |
| CN | 105365504 A | 3/2016 | |
| CN | 105365505 A | 3/2016 | |
| CN | 103009938 B | 6/2016 | |
| CN | 103879243 B | 3/2017 | |
| CN | 107816564 A | 3/2018 | |
| CN | 108349337 A | 7/2018 | |
| CN | 108349338 A | 7/2018 | |
| CN | 108349340 A | 7/2018 | |
| CN | 109070663 A | 12/2018 | |
| CN | 110114231 A | 8/2019 | |
| CN | 107816564 B | 11/2019 | |
| CN | 108349338 B | 6/2020 | |
| CN | 108349337 B | 11/2020 | |
| CN | 108349340 B | 3/2021 | |
| CN | 109070663 B | 8/2021 | |
| DE | 102019121377 A1 | 2/2021 | |
| EP | 2572903 A1 | 3/2013 | |
| EP | 2572903 B1 | 4/2016 | |
| EP | 2951036 B1 | 12/2016 | |
| EP | 3296131 A1 | 3/2018 | |
| EP | 3308986 A1 * | 4/2018 | ........... B60C 23/003 |
| EP | 3332223 A1 | 6/2018 | |
| EP | 3442813 A1 | 2/2019 | |
| EP | 3296131 B1 | 6/2019 | |
| EP | 3332223 B1 | 7/2019 | |
| EP | 3535142 A1 | 9/2019 | |
| EP | 3442813 B1 | 3/2020 | |
| EP | 3535142 B1 | 9/2021 | |
| KR | 20170029520 A | 3/2017 | |
| KR | 102256754 B1 | 5/2021 | |
| WO | WO 8701527 A1 * | 3/1987 | |
| WO | WO-2014051677 A1 * | 4/2014 | ........... B60C 23/004 |
| WO | WO-2018148945 A1 * | 8/2018 | |

* cited by examiner

SYSTEM AND METHOD FOR AUTOMATIC PRESSURE MANAGEMENT

CROSS-REFERENCE TO RELATED APPLICATIONS

This application is a continuation of U.S. application Ser. No. 16/051,225, filed 31 Jul. 2018, which claims priority to U.S. Provisional Application Nos. 62/538,981, filed 31 Jul. 2017 and 62/588,149, filed 17 Nov. 2017, each of which is incorporated herein in its entirety by this reference.

TECHNICAL FIELD

This system relates generally to the pumping field, and more specifically to a new and useful automatic pressure management pump in the pumping field.

DESCRIPTION OF THE PREFERRED EMBODIMENTS

The following description of the preferred embodiments of the pressure management system is not intended to limit the pressure management system to these preferred embodiments, but rather to enable any person skilled in the art to make and use this system.

1. Overview

Figure 1:
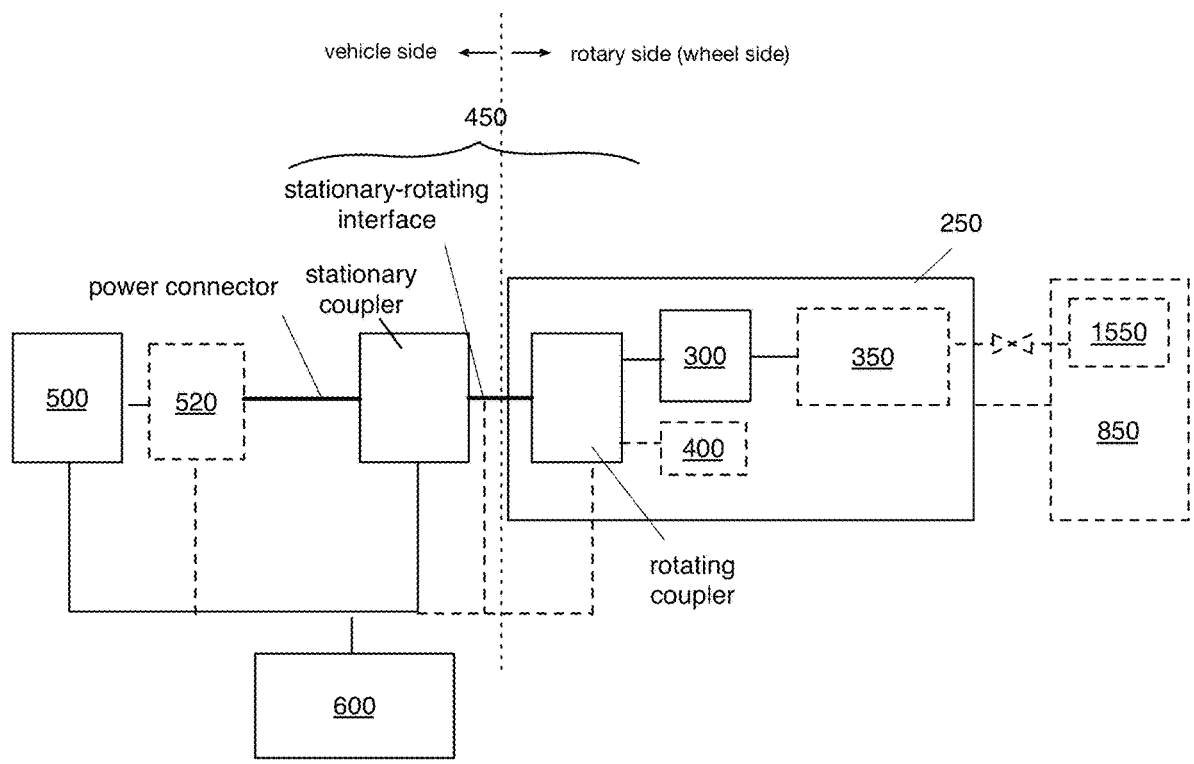
FIG. 1 is an illustration of an example embodiment of the pressure management system.

As shown in FIG. 1, the pressure management system 1100 includes: a housing unit 250, a pressurized fluid source, and a power interface 450. The pressurized fluid source can include a pump 300 and a pressurized reservoir 350. The system can optionally include a plurality of sensors 400, a pressurized reservoir 350, a centralized power source, a fluid connector 550, a control system 600, a communication system 750, and/or any other suitable components. However, the components of the pressure management system 1100 can be otherwise suitably configured and/or arranged.

The system can include one or more of the aforementioned components. For example, the system includes at least one pump, power interface, and housing unit for each tire or wheel end, wherein a vehicle can include multiple wheel ends (e.g., two per axle, multiple axles, etc.). In a specific example, the system includes at least one pump, housing, and rotary joint for each wheel end of the vehicle, and can include a single power connector electrically connecting the centralized power source to all rotary joints. However, the system can be otherwise configured.

In operation, the system can power and/or control functional modules at one or more wheel ends of a vehicle. In one variation (example shown in FIG. 5), the system determines control instructions (e.g., at a control system 600) and controls system operation based on the control instructions (e.g., to pressurize or depressurize one or more tires or pressurized reservoirs). In a second variation, the system can detect pressure and environmental characteristics of the system using a subset of the plurality of sensors 400, wherein the sensor information can be used to determine the control instructions.

The system functions to manage pressure by taking working fluid (e.g., air) out from a fluid source (e.g., the ambient atmosphere) and pressurizing (e.g., compressing) the working fluid to achieve a target pressure. In one variation, the working fluid can be compressed into a pressurized reservoir 350 or released from a pressurized container 950. This pressurized reservoir 350 can be selectively connectable to one or more pressurized containers. The pressurized container 950 is preferably one or more tires of the vehicle 200 (e.g., tires of a dual tire assembly 150 on a vehicle 200) but may alternately be any type of pressurized container that needs its pressure managed.

The system preferably controls the pressure within one or more tires to achieve a desired pressure or a desired range of pressure by controlling the selective connectivity of the pressurized reservoir 350 to the tires and/or controlling pump operation (e.g., pump state, such as on or off; pump speed; etc.). The system is preferably controlled based on sensor output from the plurality of sensors 400, wherein the control system 600 actively controls pump operation (e.g., based on pressure management system characteristics, environmental characteristics, pressure characteristics, any other suitable characteristics of a pressurized container 950, and/or any other suitable operation information).

Figure 2:
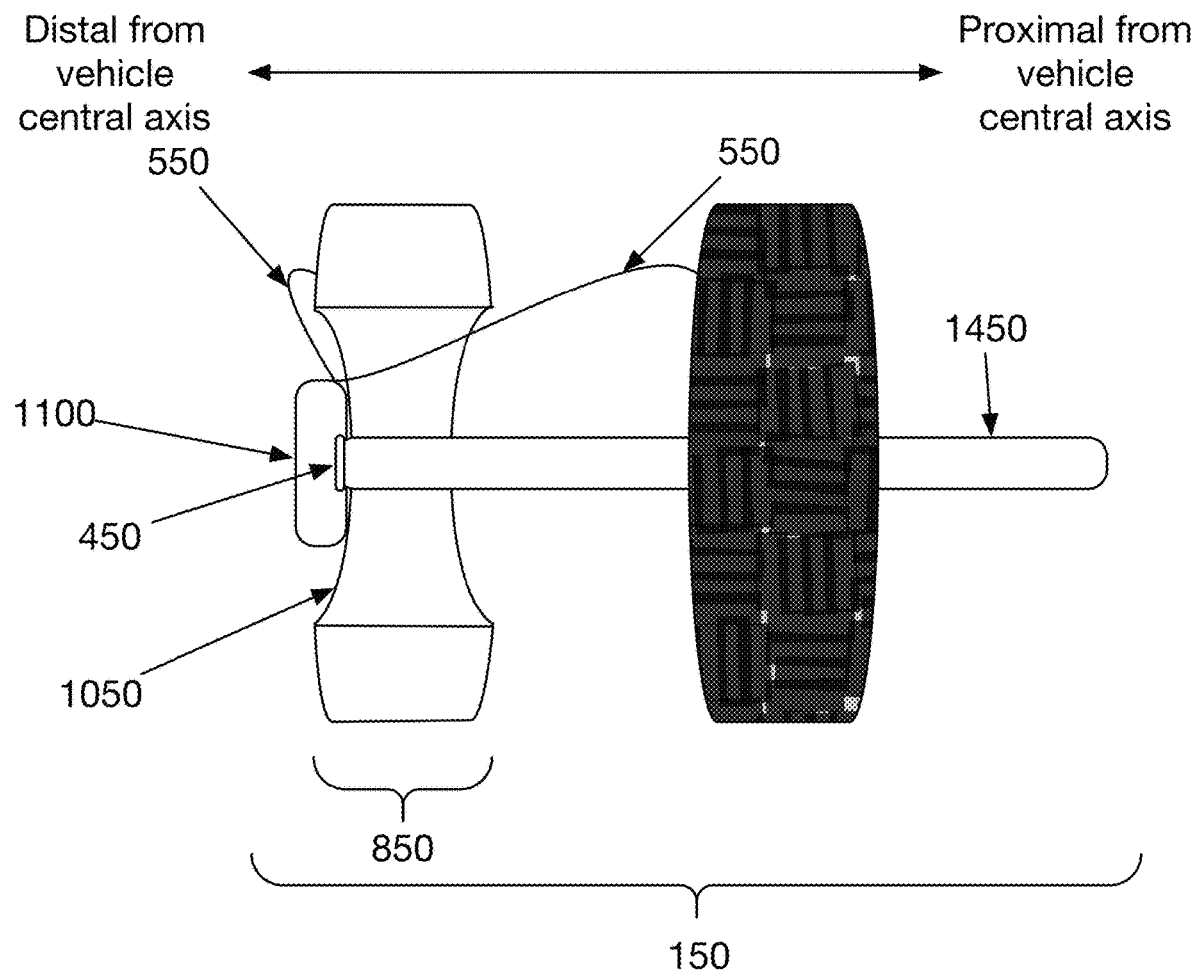
FIG. 2 is an exploded view of an example of the tire assembly with the system installed.
Figure 6:
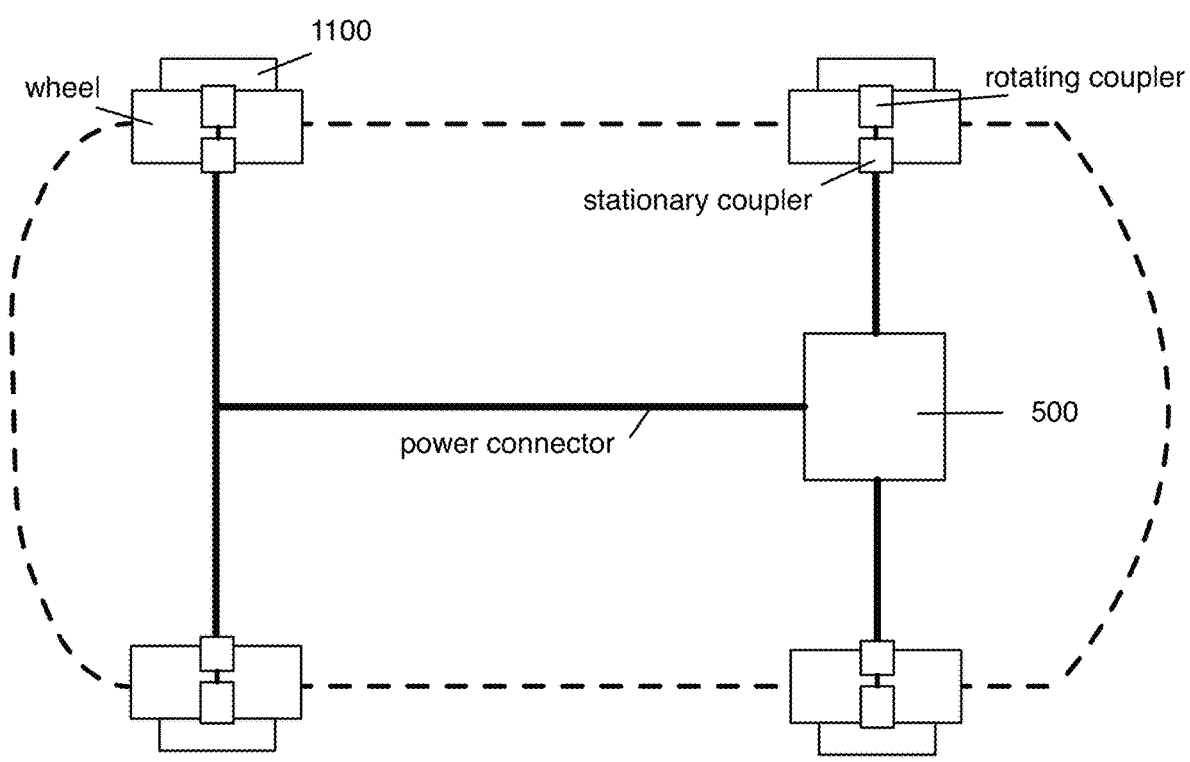
FIG. 6 is a diagram of an example architecture of a variation of the pressure management system.

In one variation, pressure management system 1100 (or portions thereof) is configured to mount to the wheel end 850, more preferably centrally located on the exterior wheel hub (e.g., located the face of the dual tire assembly 150 most distal from the central axis of the vehicle 200 as shown in FIG. 2) and/or integrated into the wheel hub 1050, but can be otherwise configured and/or mounted. In this variation, the active components of the pressure management system 1100 can be powered by a centralized power source located on the vehicle 200 and be connected to the centralized power source through the power interface 450 in order to transfer electrical power from a non-rotating, centralized power source to a rotating, wheel-mounted electromechanical component like the pump 300; example shown in FIG. 6.

In this variation, the active components of the pressure management system 1100 can be controlled by the control system 600 (e.g., a centralized control system located on the vehicle body). The control system 600 preferably determines individual control instructions for each wheel-end unit on the vehicle, but can alternatively determine control instructions for all wheel-end units (on a vehicle) as a group. In one embodiment (example shown in FIG. 5), the control system 600 controls power output from the centralized power source (e.g., controls the current phase, current magnitude, etc. of the supplied power). In a second embodiment, the control system 600 generates the control instructions, and sends the control instructions to a wheel-end local controller, which controls local component operation (e.g., valve position or state, pump state, etc.) according to the received control instructions. When the components are controlled based on wheel-end information (e.g., wheel speed, tire pressure, other sensor data, etc.), the wheel-end information can be transmitted to the control system for processing. The wheel-end information can be transmitted to the control system via the power interface or a similar system.

In this variation, the pressure management system 1100 (e.g., a unit of the pressure management system 1100) or component thereof (e.g., pressurized reservoir, pump, pump outlet, pump inlet, etc.) on a given wheel-end is preferably fluidly connectable to the tires on a single wheel end, and fluidly isolated from tires on the remaining wheel ends (e.g., of a vehicle 200) and/or components of other pressure management system units on other wheel ends, but can alternatively be fluidly connected to the remaining tires (e.g., via an internal fluid manifold, etc.).

The system and method can be used in one or more applications. In a first variation, the system can be used to actively control fluid pressure within depressurized or pressurized containers. Some applications of this can be found in the automotive industry where tire pressure is important to maintain. This pressure management system 1100 can be optimized to work in applications with a non-rotating portion (e.g., an axle 1450, an electric motor stator and/or housing, etc.) coupled to a rotating portion (e.g., the wheel).

The pressure management system 1100 is preferably configured to integrate with and/or be used in conjunction with a wheel as a pressure management system 1100, more preferably as a wheel-mounted pressure management system 1100 for a tire (e.g., one or more tires in a dual tire assembly 150, in a single tire assembly, etc.), but can be otherwise configured and/or used. The wheels are preferably mounted to a vehicle. The vehicle 200 can be a truck, trailer, cab (e.g., of a truck), consumer vehicle, bicycle, RV, or any other suitable wheeled vehicle. The vehicle 200 can be a passenger vehicle, a commercial vehicle, a vehicle specialized to carry cargo (e.g., a tractor-trailer cab or trailer), an electric vehicle, a vehicle powered by an internal-combustion engine, or any other suitable vehicle that has tires designed to be inflated by a fluid and/or other pressurized reservoirs designed to be filled with fluid. The wheels can include: hubs, tires, counterweights, and/or any other suitable wheel component. The wheels are preferably mounted to a wheel-end of an axle (of the vehicle), but can alternatively be mounted to any suitable portion of the vehicle.

The aerospace industry also manages many pressurized containers, from tires to fuselages, and this system could be used to maintain pressure in those applications. Because of the rapidly changing pressure in aerospace (especially during takeoff and landing), pressurized containers are likely to require various pressure management techniques in order to respond to these changes in pressure.

2. Benefits

Most pressurized containers suffer from at least one of the following problems: slow leakage, fast leakage, physical wear, and environmental wear. In the face of these adverse conditions, many pressurized containers do not have a reliable method to recognize or overcome these problems. Furthermore, depending on its application, relevant pressurized containers can require specialized management. This system and/or method can confer benefits over conventional systems that resolve one or more of the aforementioned issues.

First, variants of the system can reduce system complexity of centrally-controlled pressure management systems by removing or mitigating the need to transfer pressurized fluid from a non-rotating portion of the vehicle 200 to a rotating portion of the vehicle 200 (e.g., from a stationary axle to a rotating hub and/or wheel, from a stationary electric motor stator and/or casing to a rotating shaft and/or wheel, etc.). Variants of the system can enable air compression at the wheel end 850 of a vehicle 200 system for provision of compressed air to vehicle tires, instead of centralized air compression and distributed delivery of the compressed air. Placing compression at the wheel end 850 can reduce the complexity and extent of pressurized fluid manifolds and/or conduits (e.g., as compared to a centralized fluid compression system).

Second, in some variants, the housing unit 250 is can be removably mounted to the hub of a wheel, more preferably to an exterior surface of the hub or to a hub face distal the vehicle body. In these variants, the hub can be powered (e.g., include a hub-mounted power source, include a generator integrated within the hub, include a hub power interface that couples to a power line routed through the axle 1450, etc.). This pressure management system variant can aid in the installation of the system because it only needs to be mounted to the outside side of the wheel. As a result, the installation becomes cheap and easily installed compared with more integrated pressure management systems. Alternatively, the pressure management system 1100 can be integrated into the hub.

Third, the connection between the system and a pressurized container 950 can be dynamically controlled by a control system 600. Based on various input from sources including a plurality of sensors 400, the connection between the pressure management system 1100 and the pressurized container 950 can be modulated in order to maintain pressure within the calculated desired range (e.g., wherein the magnitude can be zero or nonzero).

Fourth, in some variants, the system and method benefit from a unique power interface element that can connect to a centralized power source on a vehicle 200. As a result, this system is prepared to integrate with an onboard centralized power source, allowing for easy and more consistent power transfer to the pressure management system 1100. This system can therefore pump or relieve air from a pressurized container 950 independent of relative motion of the system, unlike other systems that generate power from relative motion from the relative rotation of a wheel (e.g., using a magnet or induction system). Therefore, variants of the system can enable the pump 300 to be operated (e.g., powered) when the vehicle 200 is stationary (e.g., wheel rotation is not necessarily required to harvest energy to power the pump 300). However, the pump 300 (and/or other active components on-board a local unit) can be powered by energy harvested in a manner such as that described in U.S. application Ser. No. 14/839,009, filed 28 Aug. 2015, and/or U.S. application Ser. No. 15/696,816, filed 6 Sep. 2017, which are each incorporated herein in their entirety by this reference; by energy harvested by replacing the non-rotary portion of the overall assembly (e.g., the vehicle axle) with a stator of an electric motor and the rotary portion of the overall assembly (e.g., the wheel, hub, or system) with the rotor of an electric motor; or be otherwise powered. Additionally or alternatively, the pump 300 can use the centralized power source and/or power interface 450 to provide additional, supplementary, and/or alternative power. For example, a system with a wheel end generator can pull power from the centralized power source in cases where the wheel end generator is inoperable (e.g., due to the vehicle 200 being in a stationary state).

However, the pressure management system 1100 and/or variants thereof can otherwise confer any suitable benefits and/or advantages.

3. System.

The housing unit 250 of the system functions to enclose a subset of the elements and components of the system. The housing unit 250 can optionally provide a mounting point for a plurality of the elements within the system. For example, the housing unit 250 can have a compartment that is dedicated to holding pressurized fluid (e.g., a pressurized reservoir 350, a pressurized chamber 1550). Furthermore, this housing unit 250 can also provide structure and protection for each of the elements within the system.

This housing unit 250 can also function to define or support the rotary side of the power interface 450. The housing unit 250 can also function as a mounting point (e.g., node, structure, etc.) for auxiliary modules that can be added, integrated, or included in the pressure management system 1100 (e.g., provide a rotary mounting point, provide a mounting point that rotates with the wheel, provide a power interface 450 between the module and the power source, etc.).

Figure 4A:
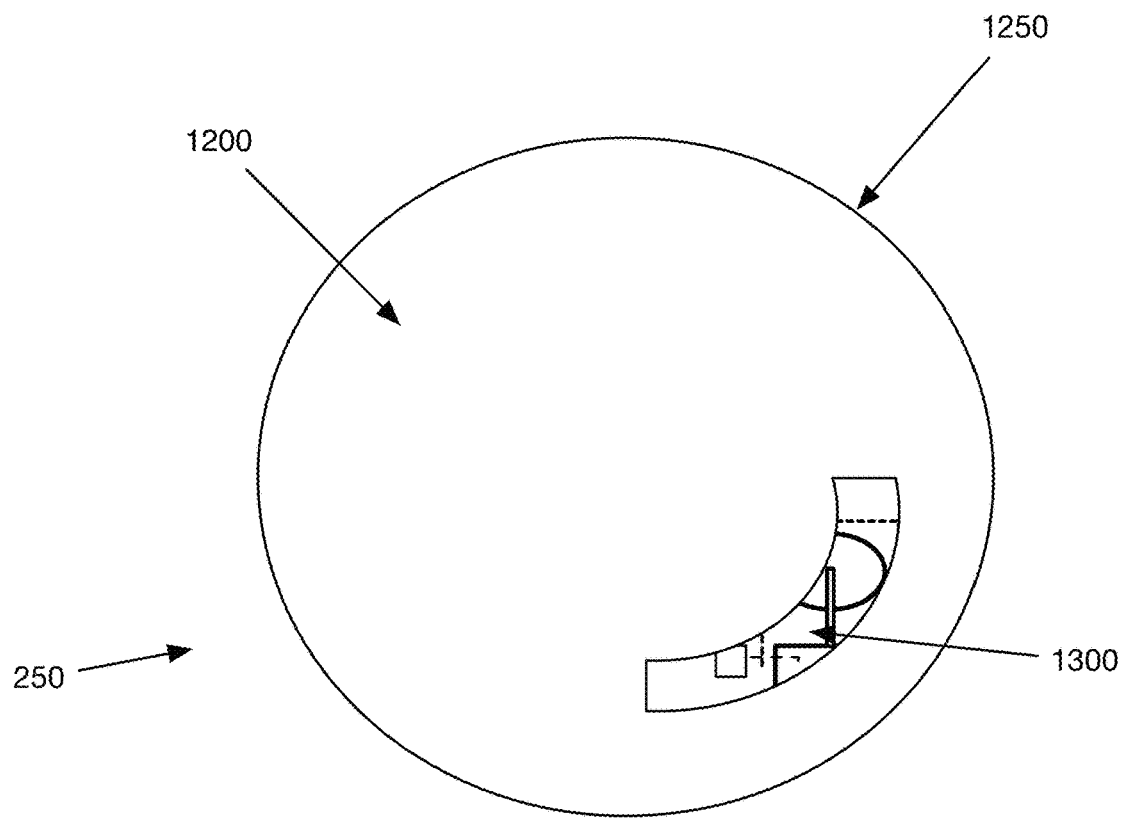
FIG. 4A is an exterior view of an example of the housing unit face of the system with a cutaway to show system components within the housing interior.
Figure 4B:
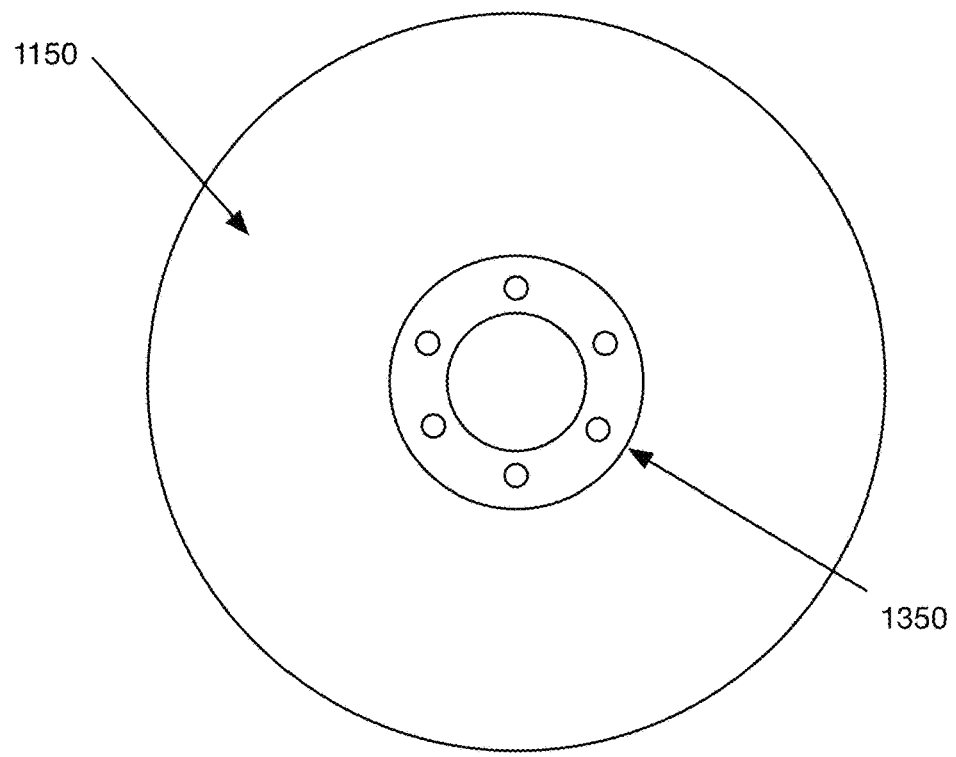
FIG. 4B is an exterior view of an example of the housing unit base of the system a cutaway to show system components within the housing interior.

As shown in the examples shown in FIG. 4A and FIG. 4B, the housing unit 250 of the system can physically enclose all or a subset of the components of the pressure management system 1100. In some variations, the housing unit 250 encapsulates all of the elements in the system except for the fluid connector 550, the control system 600 (e.g., which can be centrally located on the vehicle), the power interface 450, and the communication system 750 (e.g., wherein both the power interface and communication system can be arranged along the housing exterior or extend through the housing thickness). However, the housing unit 250 can encapsulate any suitable set of the system components.

In one variation, the housing unit 250 can define a housing base 1150 (e.g., the side of the housing unit 250 proximal the central axis of a vehicle 200 when the system is mounted to the vehicle 200) and a housing face 1200 or cap (e.g., the side of the housing unit 250 distal the central axis of a vehicle 200 when the system is mounted to the vehicle 200). Each of the housing base 1150 and housing face 1200 can have an exterior face (which cooperatively defines the housing unit exterior 1250) and an interior face (which cooperatively defines the housing unit interior 1300).

The housing unit 250 can be made of a polymer (e.g., plastic, such as polycarbonate, HDPE, and PVC, etc.), metal (e.g., aluminum, magnesium, steel, iron, titanium, etc.), or rubber, or any other suitable material or materials. The housing unit 250 can be glued or mechanically closed in order to ensure structural integrity or security of the system in face of wide range of thermal fluctuation and mechanical interference.

The housing unit 250 is preferably radially symmetric or alternatively radially asymmetric. In one example, the housing unit 250 can have the geometry of an extruded circle or a cylinder that can be rounded on each end, but can alternatively have any suitable geometry.

Figure 8:
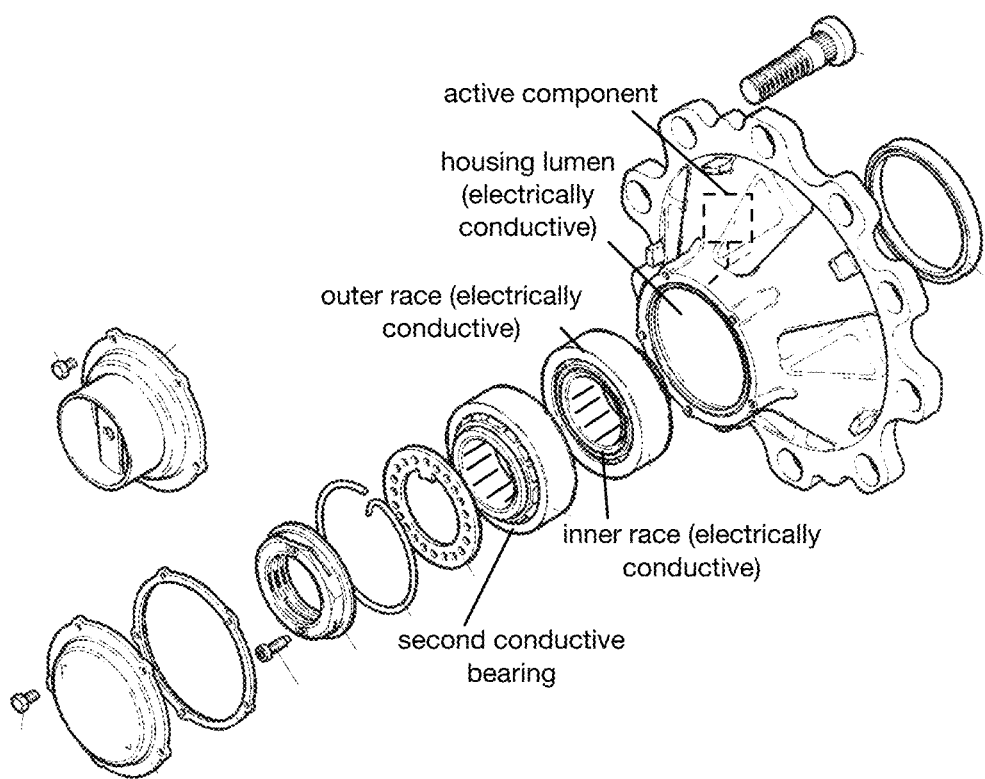
FIG. 8 is an exploded view of an example of the power interface.
Figure 9:
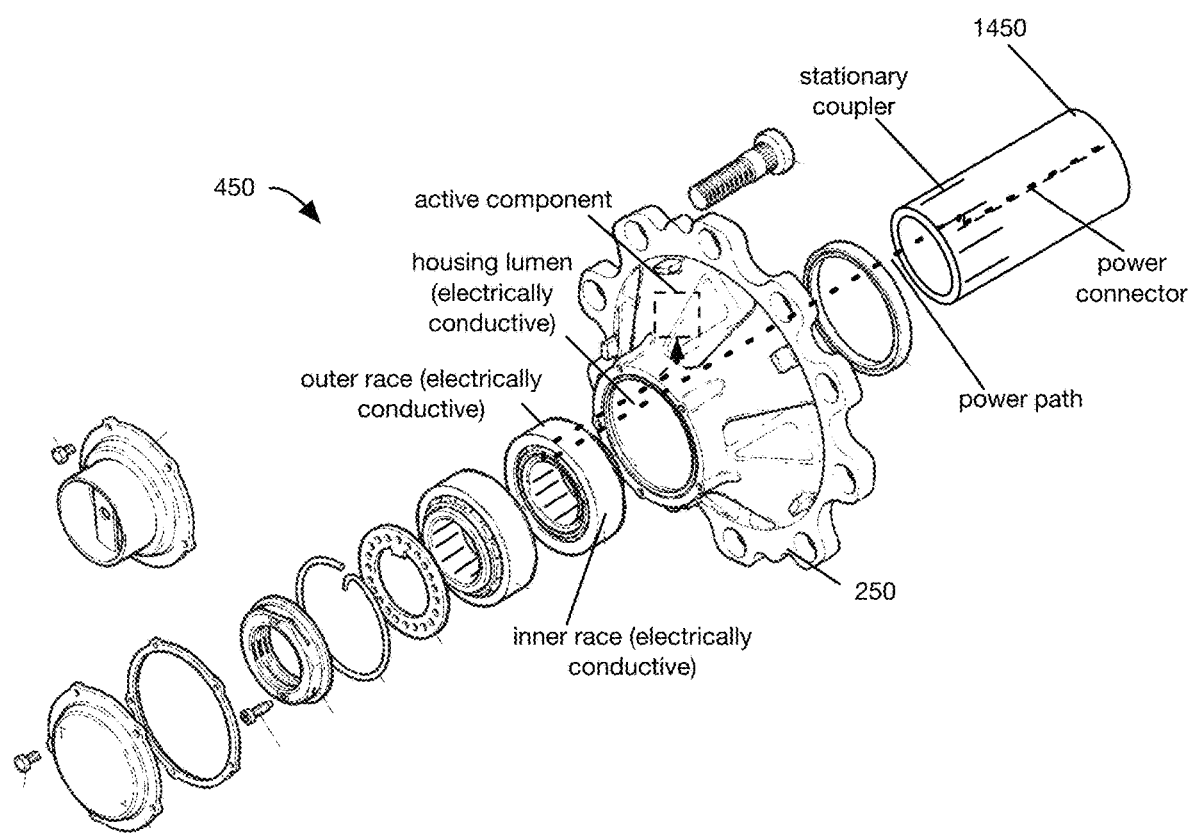
FIG. 9 is an exploded view of an example of the power interface with the power connector and a power transfer path between the power connector and the system components.

The housing unit 250 can define a lumen that accepts the axle 1450, wherein the power interface 450 is arranged along the lumen surface (e.g., along the inner arcuate surface); examples shown in FIG. 8 and FIG. 9. The lumen can be defined by a recess (e.g., concave aperture) in the housing unit side proximal the vehicle 200 (e.g., be a partially closed lumen), by a through hole (e.g., such that the housing forms a toroid; e.g., wherein the lumen is an open lumen), or be otherwise defined.

The housing unit 250 can be mounted on a wheel end 850 (e.g., example shown in FIG. 2), specifically to the exterior wheel hub. Alternatively or additionally, the housing unit 250 can be mounted to the axle 1450, the vehicle body, or to any other suitable mounting point. In variants, the housing unit can be the hub, wherein the pressure management system (or components thereof) are hub-mounted (e.g., be integrated into the hub), but can alternatively be a wheel-end component (e.g., brake drum, hubcap, etc.), a retrofit unit removably connected to the hub, or be any suitable vehicle component.

The housing (e.g., the housing base 1150) can optionally include a mounting mechanism 1350 as shown in FIG. 4B, which can aid in mounting the housing unit 250 to a variety of surfaces, or to mount the housing unit 250 to pre-defined mounting locations with specific patterns. This mounting mechanism 1350 can be a different material from the rest of the housing unit 250 and can be configured to connect with other mechanical or electromechanical coupling mechanisms (e.g., bolts, magnets, etc.); alternatively, the mounting mechanism 1350 can be a surface which locks into place with the wheel hub 1050 (e.g., to complimentary engagement points). The mounting mechanism 1350 can extend radially outward from the housing unit perimeter, can extend normal to the face of the housing unit 250 proximal to the vehicle central axis (e.g., extend axially), can be a separate bracket that mounts to the hub and to the housing, can be embedded within the housing, or can be otherwise configured. Any of these configurations can attach to relevant lug and/or spoke patterns on the wheel (e.g., 4 lug pattern, 5 lug pattern, 6 lug pattern, etc.). Examples of mounting mechanisms that can be used include screws, nuts and bolts, a holding sleeve, a welded connection, a soldered connection, an electromagnetic mechanism (e.g., ferrous material, a permanent magnet, an electromagnet, etc.), a chemical connection, or any other suitable coupling mechanism.

In a first variation, the system is configured to retrofit to an existing dual wheel assembly. In this variation, the housing unit 250 is preferably separate from and configured to mount to the wheel hub 1050, wherein the housing unit 250 can directly or indirectly mount to the wheel hub 1050 (e.g., via an intermediary bracket).

In a second variation, the housing unit 250 is integrated into and/or forms the wheel hub 1050. In this variation, the mounting mechanism 1350 of the housing unit 250 can include standard lug patterns for an axle 1450. Alternatively, the housing unit 250 can be integrated into a hubcap or other hub component.

In one variation, the housing unit 250 forms a shield that does not encase all of the elements of the system. Rather, the shield preferably shields the sides of the elements that are distal to the central axis of the vehicle 200 or the elements that are exposed to damage from environmental debris but can alternatively shield a subset of these sides. Some examples of this include a metal dome or a plastic dome covering most of the system elements.

In a second variation, the housing unit 250 is mounted to the hub via a bracket. The bracket can be mounted to the wheel hub 1050 via hub nuts that attach the housing to the bracket. The bracket can be flush with the wheel hub 1050, can wrap around the curved wheel hub sides surface, can be offset from the hub end, or can be otherwise configured. In one embodiment, the bracket can define a portion of the electrical path between the active components of the system and the central power source (e.g., the powered axle).

Alternatively or additionally, the bracket can include electrical insulation between different wheel hub contact points and/or housing unit contact points, which can help prevent electrical shorting.

In one example, the bracket can include a hub connector and a system connector. The hub connector can electrically connect the bracket to the central power system (e.g., via the powered axle) by: extending through the hub to the axle interface; electrically connecting to a hub outlet (e.g., at the mounting points, such as a wheel hub bolt hole; via the mounting mechanism 1350, such as the hub bolt; via surface connectors, etc.), wherein the hub outlet is electrically connected to the powered axle (e.g., by wires or an integrated set of leads extending through the hub); or otherwise connecting to the hub.

The bracket can also include one or more system connectors (e.g., secondary electrical connectors) arranged proximal the housing unit 250 that also aid in power transfer. In particular, the system connector(s) can electrically connect the bracket to the remainder of the active components of the system. The system connector can be defined along the bracket face proximal the housing unit 250, along the mounting points for the housing unit 250, or otherwise located. The system connector can include: flush contacts, plugs, pins, wires, inductive coils, the housing unit bolt holes, or any other suitable interface. In this embodiment, the housing unit 250 can also include electrical contacts on the housing unit exterior 1250 (bracket contacts), complimentary to the system connectors. These bracket contacts can optionally function to cooperatively seal the connectors and can be recessed into the housing unit 250, protrude from the housing unit 250, or be flush with the housing face 1200.

In a third variation, the housing unit 250 can be directly mountable to an exterior face of the hub. In this variation, the housing unit 250 can include one or more hub connectors (e.g., similar to those discussed above for the bracket), arranged along the housing surface configured to mount proximal the hub. However, the housing unit 250 can be otherwise configured.

In a fourth variation, the housing unit 250 can be directly mountable to the axle 1450, wherein the axle 1450 is preferably powered (e.g., wherein power is supplied to the axle end or arcuate surface), but can alternatively include electrical connectors (e.g., system connectors), or any other suitable power interface. In this variation, the housing unit 250 can form the hub, form a hub insert, or be otherwise configured.

In a fourth variation, the housing unit 250 can be integrated with a hubcap system (e.g., a standard hubcap, a grease cap, etc.). As a result, the housing unit 250 could be mounted like a regular hubcap. In this variation the power interface 450 can be defined along the hub interface, by pins extending from the hubcap surface proximal the hub, or otherwise arranged.

The pressurized fluid source functions to provide pressurized fluid to a fluid endpoint (e.g., a tire). The pressurized fluid source can include a pump 300 and a pressurized reservoir 350, and can optionally include one or more active valves, fluid manifolds (e.g., defining fluid paths), or any other suitable component. The pressurized fluid source (and/or components thereof) is preferably controlled by the control system 600 (e.g., via the power supplied to the components, via control instructions supplied to the components, etc.), but can be otherwise controlled. The components of the pressurized fluid source are preferably independently electrically connected to the power source and/or control system, but can alternatively be electrically connected by a common connection (e.g., power bus, data bus, etc.).

The pressurized fluid source is preferably statically mounted to the wheel-end (e.g., rotatably mounted to the axle or vehicle body; e.g., to the housing unit), but can be otherwise mounted to the vehicle. Each system or vehicle can include one or more pressurized fluid sources (e.g., for each wheel-end; each tire; each axle; etc.). Individual pressurized fluid sources can be fluidly isolated or connected.

Figure 3:
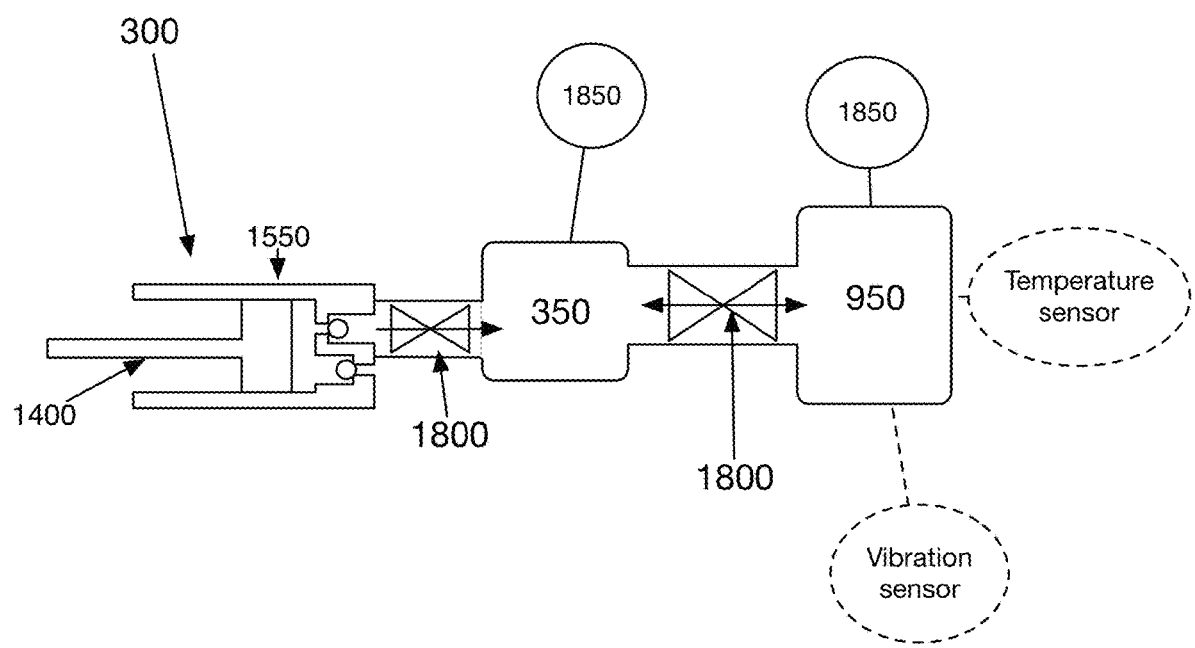
FIG. 3 is a schematic representation of an example of the connections between system components.

As shown in the example shown in FIG. 3, the pump 300 of the pressure management system 1100 functions to transfer fluid from a fluid source (e.g., the ambient environment, a fluid reservoir such as a tank, etc.) to a pressurized reservoir 350 (e.g., a tire, a fluid storage tank, etc.). The pump 300 of the pressure management system 1100 can also function to compress fluid and transfer the compressed fluid to the pressurized reservoir 350 (e.g., the pump 300 can function as a compressor). Fluid pressurization can happen independently from other processes performed by the pressure management system 1100 but can alternatively be linked to other processes. Fluid pressurization is preferably actively controlled (e.g., by the control system 600; by a local control system according to control instructions generated by the control system 600; etc.), but can alternatively be passively controlled (e.g., based on pressure differentials between the tire and the pressurized reservoir 350, based on wheel rotation, etc.). The pump 300 is preferably operated when the pressurized reservoir 350 needs more pressure (e.g., when the tire pressure is below a target pressure, when the pressurized reservoir 350 is below a target pressure, etc.). In one variation, while the pressure management system 1100 is in operation, the control system 600 controls the pump 300 based on operating instructions 650 that can be predetermined operating instructions and/or operating instructions dynamically determined based on sensor signals sampled by the plurality of sensors 400 and/or operation parameters. The sensor signals are preferably sampled in real-time but can alternatively be sampled in near-real time, sampled at a sampling interval, or determined before system operation, or determined at any suitable time. The operation parameters can include: vehicle operation parameters (e.g., determined from sensor measurements sampled by sensors on-board the system, determined from a CAN bus, etc.), secondary pump operation parameters (e.g., of a secondary system on the same vehicle, on a second vehicle, etc.), ambient environment parameters (e.g., sampled by an external sensor, retrieved from a database, etc.), route parameters (e.g., traffic, road conditions, etc.; retrieved from a database, determined by a distributed vehicle network, or otherwise determined), or any other suitable operation parameter, determined in any suitable manner.

The pump 300 is preferably mounted to the housing unit, but can alternatively be mounted to the axle or to any suitable location. The pump 300 is preferably mounted to the housing unit interior, but can alternatively be mounted to the housing unit exterior. In a specific example, the pump 300 is a hub-mounted pump (e.g., integrated into the hub, removably mounted to the hub via the housing unit 250).

Each wheel end 850 preferably includes a single pump but can alternatively include multiple pumps. Each axle preferably includes two or more pumps but can alternatively include a single pump or any suitable number of pumps. Each vehicle preferably includes two times the number of axles of pumps but can alternatively include the same number of pumps as axles, a single pump, or any suitable number of pumps. The pump 300 preferably rotates with the wheel but can alternatively be static relative to the vehicle body, static relative to a gravity vector, or otherwise arranged. The pump 300 is preferably mounted to the housing interior of the housing unit 250, but can alternatively be mounted to the housing exterior, be separately mounted to a rotating surface of the vehicle 200 (e.g., statically mounted to the wheel end 850), such as a wheel hub 1050, a hubcap, a wheel, a tire sidewall, and/or any other suitable surface. For example, the pump 300 can be configured to bolt onto a preexisting bolt pattern at the wheel end 850 (e.g., the pump 300 can include a housing that defines a bolt hole pattern that matches at least a portion of a preexisting bolt pattern). However, the pump 300 can be otherwise suitably configured to couple to the rotating surface in any suitable manner.

The pump 300 can be aligned with the rotary axis of the wheel or can be offset from the rotary axis. In the latter case, the system can include a second component that acts as a counterbalance to the offset pump (e.g., with a comparable mass and arranged a substantially similar radial distance away from the rotary axis of the wheel; with a different mass and arranged at a different radial distance away from the radial axis; etc.). The components of the system are preferably arranged such that the weight is equally distributed or counterbalanced across the rotary axis of the system, but the components can be otherwise arranged. More massive components (e.g., components with higher mass than other components) are preferably mounted radially inward, but can alternatively be mounted in any suitable position.

The pump 300 is preferably fluidly connected to fluid sink or endpoint, wherein the fluid sink can be a pressurized reservoir 350 (e.g., of the system), a pressurized container 950 (e.g., tires), or be any other suitable fluid sink. The pump 300 can optionally be fluidly connected to a fluid source of working fluid. This fluid source can be the ambient environment (e.g., housing exterior, etc.), a tank, a tank on-board vehicle (e.g., fluidly connected through an axle 1450, separate fluid manifold/tubing, etc.) or any other suitable fluid source. The pump 300 is preferably also electrically connected to the power interface 450, more preferably to the pump-side interface of the power interface 450 (e.g., the rotary coupler), but can alternatively be connected to a vehicle-side interface (e.g., the stationary coupler) or to any other suitable portion of the power interface 450.

The pump 300 preferably includes a drive mechanism, an actuation mechanism 1400, and a pressurization chamber 1550, but can additionally or alternatively include any suitable mechanism. The drive mechanism is preferably actively actuated, but can alternatively be passively actuated (e.g., as described in U.S. application Ser. No. 15/280,737, filed 29 Sep. 2016, which is incorporated herein in its entirety by this reference). The drive mechanism can be a motor, an air compressor, a hydraulic actuator, pneumatic actuator, spring, thermal actuator, rotary motion of the wheel, gravity, or be any other suitable drive mechanism.

In one variation, the drive mechanism of the pump 300 includes a motor that functions to actuate an actuation mechanism 1400 of the pump 300, wherein the actuation mechanism 1400 interfaces with the pressurization chamber 1550 to pressurize and/or move the working fluid. The motor is preferably powered by electrical power received from the power interface 450 but can alternatively or additionally harness mechanical energy (e.g., from wheel rotation, axle rotation, etc.), thermal energy, or use any suitable energy source.

The motor can be connected to the power interface 450 (e.g., the rotary coupler of the power interface 450) by wires extending within the housing, by a set of leads defined in a PCB (e.g., supporting a power supply modulator, power circuitry, etc.), by a set of electrical contacts defined by the housing, by a set of electrical connectors extending from the power interface 450, or be otherwise connected to the power interface 450.

In a first embodiment, the motor is an electric motor. In one example, the electric motor can be that disclosed in U.S. application Ser. No. 15/696,816, filed 6 Sep. 2017. Alternatively or additionally, the electric motor can be an outrunner motor, an inrunner motor, a brushed motor, a brushless motor, an alternating-current motor, a direct-current motor, a permanent magnet motor, an induction motor, a servo motor, a stepper motor, and/or any other suitable motor.

In a second embodiment, the motor is a mechanical crank that utilizes the mechanical rotation of an axle 1450 on a vehicle 200 as a crank. The physical rotation of the axle 1450 acts to actuate the actuation mechanism 1400 of the pump 300. An example of this mechanical crank is attaching the actuation mechanism 1400 to the axle 1450 itself so that the pump 300 functions as the axle 1450 rotates.

In a second variation, magnets are used to drive the actuation mechanism 1400. In this variation, magnets can be located both on a relatively rotating and a relatively stationary part of the system (e.g., the wheel and the vehicle 200 respectively when the system is used on a vehicle 200). As the magnets pass each other, the attraction or repulsion of the magnets serve to move the actuating mechanism.

However, the pump 300 can include any suitable motor or set thereof.

The actuation mechanism 1400 of the pump 300 functions to exert force on a fluid in order to cause movement and/or pressurization of fluid. The actuation mechanism 1400 is connected to the aforementioned motor and it rests inside of a chamber 1550. The actuation mechanism 1400 is preferably operable between an intake mode, a pressurization mode, and an outflow mode, but can alternatively or additionally be operable in any other suitable position or mode. In the first mode, fluid is first introduced into a chamber 1550, wherein the actuation mechanism 1400 creates space for the fluid to enter. In the second mode, the actuation mechanism 1400 moves to exert force on the fluid to cause the fluid to move or pressurize. In the third mode, the fluid is retained in the chamber 1550 or moved into a pressurized reservoir 350 configured to hold the pressurized fluid. However, the modes can be otherwise defined.

In a first variation, the actuation mechanism 1400 is a piston as shown in FIG. 3. In a first embodiment, the piston can include a linear actuator. In this embodiment, the linear actuator is preferably cylindrical, but can alternatively be any other suitable shape. In a second embodiment, the piston can be a triangular piston which rotates around in the chamber 1550 (e.g., similar to the piston of a Wankel engine). However, the piston can be otherwise configured.

In a second variation, the actuation mechanism 1400 is a membrane. The membrane is preferably malleable and can expand and contract, but it alternatively can be rigid. An example of this is a malleable plastic membrane that can expand to contain fluid, then contract to move or compress fluid.

The chamber 1550 of the pump 300 functions to hold pressurized fluid. The chamber 1550 preferably encloses the piston and is fluidly sealed to keep fluid in during the pressurization mode of the actuation mechanism 1400 but can curve around the piston or be otherwise configured. As shown in FIG. 3, the chamber 1550 can be connected to the pressurized reservoir 350 preferably through one or more fluid manifolds (e.g., defined by the housing, defined by tubing, etc.). The fluid manifold(s) can optionally include one or more valves. The valves are preferably unidirectional (e.g., open toward the pressurized reservoir 350; open when the chamber 1550 pressure exceeds the pressurized reservoir 350, etc.), but can alternatively be bidirectional. The valve 1800 is preferably an active valve (e.g., a solenoid) controlled by the local control system but can alternatively be a passive valve. The chamber 1550 is preferably defined by the housing unit 250 but can alternatively be mounted to the housing unit 250 or otherwise defined.

In a first variation, the chamber 1550 is a cylindrical chamber that substantially matches the shape of the cylindrical piston, wherein the longitudinal axes of the piston and chamber 1550 are preferably coaxially aligned. In a second variation, the chamber 1550 is circular and allows for piston rotation, wherein the rotation axis of the piston is preferably coaxially aligned with the chamber center. However, the chamber 1550 can be otherwise configured and arranged relative to the piston.

As shown in FIG. 3, the system can optionally include a pressurized reservoir 350, which functions to store pressurized fluid. The pressurized reservoir 350 preferably functions as an intermediary holding volume for fluid pressurized to the target pressure but can alternatively or additionally function as a secondary pressurization chamber (e.g., wherein serial air packets moved into the pressurized reservoir 350 incrementally increases the pressurized reservoir's pressure) or be otherwise used. The reservoir is preferably located within the housing unit 250 (e.g., is preferably defined by the housing unit 250), but can be alternatively outside of the housing unit 250. The system can include one or more reservoirs, each paired with one or more pumps and/or fluid sinks. The reservoir is preferably removably connected to one or more tire(s) through one or more fluid manifolds (e.g., defined by the housing unit 250, defined by tubing, etc.), but can be otherwise connected to a fluid sink. The fluid manifold(s) can optionally include one or more valves. The valves are preferably unidirectional (e.g., open toward the pressurized reservoir 350; open when the chamber 1550 pressure exceeds the pressurized reservoir 350, etc.), but can alternatively be bidirectional. The valve 1800 is preferably an active valve (e.g., a solenoid) controlled by the local control system but can alternatively be a passive valve.

In a first variation of the pump 300, the pump 300 is a reciprocating pump. In one example, the pump can be the pump disclosed in U.S. application Ser. No. 14/839,009, filed 28 Aug. 2015, which is incorporated herein in its entirety by this reference. However, the pump 300 can be any other suitable reciprocating pump. Additionally or alternatively, the pump 300 can be a rotary pump, a peristaltic pump, an electrically-driven pump, a mechanically-driven pump, a diffusion pump, a cryogenic pump, and/or any other suitable mechanism for pumping and/or compressing fluid. In a second variation, the pump 300 is a peristaltic pump. In a third variation, the pump 300 is a centrifugal pump. In a fourth variation, the pump 300 is a rotary pump.

The power interface 450 of the system functions to aid in transferring power from a primary power source 500 (e.g., a centralized power source, a source located away from the wheel ends 850 of the vehicle 200, while not necessarily located at the geometric center or mass centroid of the vehicle 200) to the pump 300 and any other components of the pressure management system 1100 that require electrical power (e.g., the plurality of sensors 400, a secondary power source, communication system 750, control system 600, etc.); example shown in FIG. 1.

The power interface 450 preferably provides DC power to the wheel-end systems (e.g., the pump, valves, etc.), but can alternatively provide AC power to the wheel-end systems, or any other suitable power. When the power supplied to the wheel-end system is different from the power accepted by the respective active components, the power can be converted (e.g., from DC to AC, from a first to a second voltage or frequency, etc.), regulated, amplified, transformed, or otherwise managed. This secondary power management is preferably performed by circuitry on-board the wheel-end system, but can alternatively be performed at the rotary junction (e.g., by electrical circuitry at the rotary junction, through the physical configuration of the rotary coupler and/or stationary coupler), or otherwise managed.

The power interface 450 (or similar system thereto) can optionally transfer data (e.g., control instructions, sensor data, etc.) between a local control system (e.g., on-board the wheel end) and a central control system 600 (e.g., vehicle computing system, user device in the hub, etc.).

Each vehicle or system preferably includes a single power interface but can alternatively include multiple power interfaces (e.g., one per: primary power source 500, axle 1450, wheel, wheel end 850, etc.).

The primary power source 500 functions to provide power to the wheel-end system(s). The primary power source 500 is preferably centralized (e.g., centralized power source, central power source) and shared by multiple pressure management systems (e.g., multiple pump systems on the same vehicle 200, axle 1450, or wheel end 850), but can alternatively be independently paired with a single pressure management system 1100.

The primary power source 500 can be a battery (e.g., vehicle battery; secondary battery, etc.), an alternator coupled to an engine (e.g., an internal-combustion engine), an electric dynamo, a solar panel, a thermoelectric convertor, a gravitational energy harvester, a supercapacitor, a capacitor, an inductor, and any other suitable source and/or repository of electrical, electromagnetic, kinetic, potential chemical, and any other suitable form of energy. The primary power source 500 is preferably located on the vehicle 200 (e.g., in a battery bank, in an engine compartment of the vehicle 200), arranged proximal the wheel end 850 (e.g., adjacent to an electric motor arranged adjacent to the wheel), within a region at the base of the vehicle 200, arranged atop the vehicle 200 (e.g., such as a solar panel atop the vehicle 200), and/or be arranged at any other suitable location. In the embodiment in which the primary power source 500 is a vehicle power source, the vehicle power source can be a battery (e.g., lithium-ion, nickel-cadmium, etc.), an alternator, an inductive system (e.g., that receives power from the road or tracks when the vehicle 200 is in operation) or be any other suitable vehicle power source. In another embodiment, the primary power source 500 can be a wheel end source (e.g., local power on second pump, a second pump functions as a generator, etc.) or any other suitable source.

In a first variation, the power interface 450 converts between mechanical energy into electrical energy (and/or vice versa) across the interface between the non-rotating and rotating portions of the vehicle 200 proximal to the vehicle 200. In a first example of this variation, the power interface 450 can convert mechanical energy (e.g., rotational kinetic energy) between the fixed and rotating portions of the vehicle 200 (e.g., the fixed axle and the rotating wheel) into electrical energy (e.g., via a dynamo energy harvesting mechanism) and store the electrical energy at a secondary power source (e.g., a battery) at the wheel end 850. In a second example of this variation, the power interface 450 can convert electrical energy sourced from the stationary side of the interface (e.g., from a car battery, an alternator of the vehicle 200) into mechanical energy (e.g., rotational kinetic energy, elastic potential energy, etc.), and store the mechanical energy at a secondary power source (e.g., a flywheel, a torsion spring, a linear spring, etc.) at the wheel end 850. In related examples, the energy at the wheel end 850 (e.g., electrical energy, mechanical energy) can be used to directly power the pump 300 in lieu of storing the energy at a secondary power source.

Figure 7:
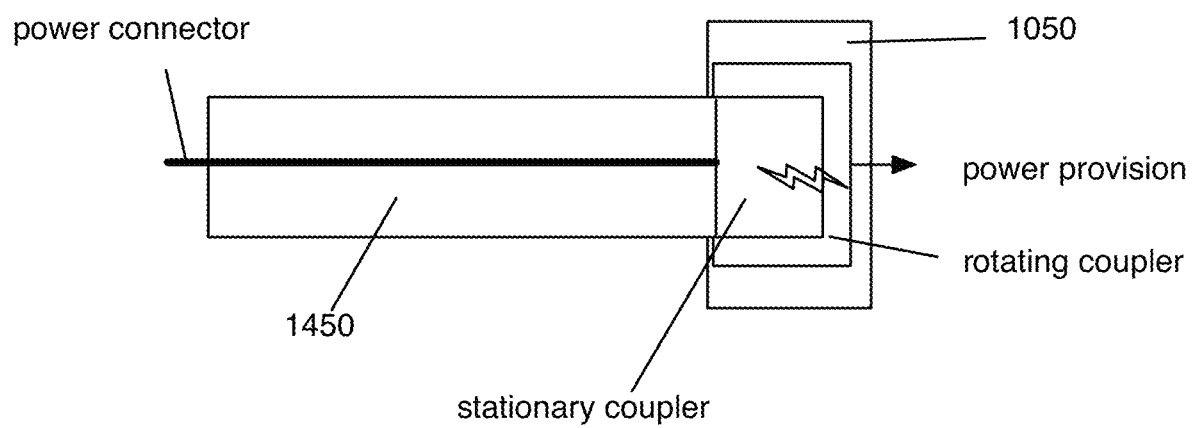
FIG. 7 is a cross sectional view of an example of a portion of the pressure management system.

In a second variation, the power interface 450 transfers electrical energy across the interface between the stationary and rotating portions of the wheel end 850 of the vehicle 200; example shown in FIG. 7. Electrical energy can be transferred through direct electrical contact (e.g., a sliding collar contact, intermittent contact via brushes as in a brushed motor, contact without brushes as in a brushless motor, etc.), indirect electrical contact (e.g., conduction through a conductive fluid medium, inductive transfer between a primary coil attached to the stationary portion and a secondary coil attached to the rotating portion, etc.), wireless power transmission (e.g., a microwave beam, an optical power converter, etc.), and/or by any other suitable electromagnetic energy transfer mechanism. Indirect electrical power transfer can be performed by way of near-field transfer and/or far-field transfer. Near-field transfer of electrical power is preferably non-radiative and can include coupling of time varying electromagnetic fields (e.g., between the stationary and rotary coupler acting as transmitter and receiver, respectively), as well as any other suitable form of non-contact coupling between electromagnetic energy sources and sinks. Far-field transfer of electrical power is preferably radiative and includes transmission of energy by way of laser radiation, visible light, ultraviolet light, infrared light, radio waves, and microwaves, as well as any other suitable form of radiation. In the case of either near-field or far-field electrical power interface, electrical power is preferably transferred between the static coupler and the rotary coupler, wherein the static coupler and/or the rotary coupler preferably include suitable components for power transfer (e.g., the static coupler includes a laser emitter and the rotary coupler includes an optoelectronic receiver and converter in the case of far-field laser energy transfer). However, electrical power can be otherwise suitably transferred between the stationary and rotating portions of the wheel end 850 of the vehicle 200 using any other suitable components.

The power interface 450 preferably includes a power connector and a rotary joint (rotary electrical joint), wherein the rotary joint includes a static coupler and a rotary coupler but can additionally or alternatively include a data connector (e.g., integrated into the power interface 450; using the power interface 450; be a parallel system adjacent the power interface 450; etc.), and/or any other suitable components.

The power connector of the power interface 450 functions to route power from the primary power source 500 to the wheel-mounted elements of the system. The power connector is preferably substantially permanently electrically connected to the primary power source 500 (e.g., wired to the primary power source 500), but can be removably or intermittently electrically connected to the primary power source 500, or be otherwise connected to the primary power source 500. The power connector is preferably electrically coupled to the rotary joint (e.g., via the static coupler), but can be otherwise coupled to the axle end, the wheel, or the wheel end 850; example shown in FIG. 7. The power connector can be integrated into the vehicle 200 (e.g., integrated into the axle 1450 of the vehicle 200), added onto the vehicle 200 post-manufacture (e.g., routed through the axle 1450 of the vehicle 200, routed around the axle 1450 of the vehicle 200, routed along an inner or outer surface of a body panel of the vehicle 200, etc.), or otherwise suitably coupled to the vehicle 200.

The power connector can be electrically connected between the primary power source 500 and one or more endpoints. The endpoints can be: wheel ends, axle ends, axles, pressure management systems, or any other suitable electrical endpoint. The system (and/or vehicle 200) can include one or more power connectors. In a first variation, the vehicle 200 includes two times as many power interfaces as axles, wherein each axle includes two power connectors, each extending toward a respective axle end. In this variation, the power connectors are preferably substantially electrically isolated from each other (e.g., not electrically connected except through the primary power source 500 and/or electrical ground, such as the vehicle 200 frame or axle exterior).

In a second variation, the vehicle 200 includes a single power connector, wherein the single power connector extends to each wheel end. However, the vehicle 200 or system can include any suitable number of power connectors.

In a first variation, the power connector includes an electrical power cable that is routed from the primary power source 500 through a hollow stationary axle to the static coupler arranged proximal the end of the stationary axle; example shown in FIG. 9. In this first variation, the cable can be routed through a side of the hollow axle (e.g., via a drilled hole), routed through a conductive feedthrough integrated with the static coupler and the axle 1450 (e.g., a built-in interface of the static coupler accessible from within the hollow axle), routed along a side of the axle 1450 (e.g., longitudinally along an axle exterior, etc.), or otherwise suitable routed.

In a second variation, the power connector includes a conductive layer of the axle 1450 (e.g., an embedded cylindrical layer, a surface layer, an embedded trace or wire, etc.) integrated therein that routes the power from the primary power source 500 to the static coupler. In a related variation, the power connector includes the axle body itself, which in this variation is metallic and conductive, and is directly connected to the primary power source 500 and thereby conducts electrical power to the end of the axle 1450.

In a third variation, the vehicle 200 includes a motor (e.g., an electric motor) arranged proximal the wheel end 850, and the power connector routes power to the output shaft of the motor (e.g., via a cable, energizing the output shaft itself, via a conductive collar around the shaft, via a conductive fluid, etc.).

In a fourth variation, the power connector includes a mechanical linkage that functions to transfer mechanical power from the primary power source 500 (e.g., the engine) to the wheel end 850. In this variation, the power interface 450 can include a crank shaft, a secondary axle, an interlinked series of springs, and any other suitable mechanical linkage.

However, the power connector can additionally or alternatively include any suitable means of transferring power (e.g., electrical power, mechanical power) from the primary power source 500 to a stationary (e.g., not rotating with the wheel) surface proximal the wheel end 850.

The power interface can optionally include one or more power management systems 520 that control power provision from the centralized power source to the endpoints. The power management system preferably operates (e.g., controls power output from the central power source) based on instructions received from the control system 600, but can alternatively supply as much power as is pulled by the wheel end system(s), or otherwise control power provision. In one variation, the power interface includes a single power management system for all power connectors. In a second variation, the power interface includes a power management system for each axle or wheel-end. In a third variation, the power interface includes a power management system for each wheel-end system. However, the power interface can include any suitable number of power management systems.

The power management system(s) is preferably located on-board the vehicle body (e.g., with the centralized power source), but can alternatively or additionally be located on the wheel-end system. Examples of power management systems that can be used include: a motor drive (e.g., 2-phase, 3-phase, etc.; which dynamically adjust the current magnitude and/or current phase supplied to the windings of the stationary coupler), a voltage regulator (e.g., feed forward, negative feedback, etc.), or any other suitable power management system.

The rotary joint functions to transfer power from the stationary power connector to the rotating system. The rotary joint can form a rotating electrical joint, a slip ring (e.g., brushed, brushless, mercury-wetted, pancake slip ring, wireless slip ring, etc.), fluid rotary union, electrical resonant transformer circuit (e.g., a Tesla coil), or any suitable electromechanical device that allows the transmission of power and/or electrical signals. The rotary joint preferably includes one or more static couplers, each paired with one or more rotary couplers. The static coupler(s) are preferably arranged on the vehicle 200 and statically connected to the power connector, while the rotational coupler(s) are preferably arranged on the system and statically connected to the active system components (e.g., the pump 300). However, the rotary joint can be otherwise constructed and/or arranged.

Each power interface preferably includes at least one rotary joint, more preferably a rotary joint for each wheel end, but alternatively a rotary joint for each wheel (e.g., two rotary joints per wheel end for dual tire assemblies), or any suitable number of rotary joints.

The static coupler of the rotary joint functions to receive power from the power connector, and to transfer the power to the rotary coupler. The static coupler is preferably rigidly affixed to the stationary portion of the wheel end 850 (e.g., a stationary axle; a stationary axle mount mounting a rotating axle; rotationally static relative to the vehicle 200 body). However, the static coupler can additionally or alternatively be bodily integrated with the stationary portion of the wheel end 850 (e.g., the endcap of the stationary axle can define the static coupler along an arcuate segment or flat face), and/or otherwise suitable coupled to the stationary portion of the wheel end 850.

Each rotary joint preferably includes a single static coupler but can alternatively include multiple static couplers per rotary joint. When the rotary joint includes multiple static couplers, the static couplers can be: arcuately aligned (e.g., along the axle cross section), axially aligned (e.g., stacked along the axle central axis), or otherwise arranged. The static coupler can trace the stationary component (e.g., axle 1450) perimeter (e.g., form a ring, or segments thereof, about the axle), extend from the stationary component (e.g., axle 1450) perimeter (e.g., radially), extend along an arcuate segment of the stationary component (e.g., axle 1450) perimeter, or be otherwise arranged or configured. When the rotary joint includes multiple static couplers, the individual static couplers are preferably electrically insulated from each other (e.g., by non-conductive material, by sheathing, etc.), but can alternatively be electrically connected. Each of the plurality of static couplers can be provided the same power (e.g., current, voltage) or different power. In the latter instance, the set of static couplers that electrically contact the same rotary coupler can be supplied different current (e.g., of different magnitude, phases, etc.), wherein serial rotary coupler contact with each static coupler of the set can supply time-variant power to the rotary coupler and/or electrically connected components. In one variation, each static coupler can include a surface contact, and be electrically connected to the power connector by leads or wires extending through the axle interior. In a second variation, each static coupler can be electrically connected to the power connector by leads or wires extending along the axle exterior. However, the static coupler can be otherwise arranged or configured.

In a first variation, the static coupler includes a collar affixed to an outer rim of the stationary axle proximal an end of the axle 1450, wherein the collar contacts a conductive surface of the rotary coupler. The collar can be smooth, grooved, brushed (e.g., with one or more conductive brushes extending radially outward from the collar), include conductive bearings, or include any other suitable electrical contact feature. The electrical contact feature can, in examples, continuously (e.g., via sliding) and/or discontinuously (e.g., intermittently) contact the conductive surface of the rotary coupler in order to provide electrical contact between the static coupler and the rotary coupler. The collar can extend along the entirety of the arcuate perimeter of the axle, along a portion of the axle arcuate perimeter (e.g., form a pattern), along a face of the axle (e.g., the endcap of the axle), or be otherwise configured.

In a second variation, the static coupler includes an electromagnetic element that is energized by (e.g., receives power from) the power connector and is inductively coupled to the rotary coupler (e.g., to a secondary conductive coil of the rotary coupler). In this variation, the static coupler can be coaxial with the axle and the rotary coupler, be offset from one or the other of the axle longitudinal axis and the rotary coupler, be offset from both the axle and the rotary coupler or be otherwise suitably arranged. In this variation, the static coupler can include one or more windings, wherein each winding can include one or more coil sets (e.g., each with one or more coils, which can be wrapped about one or more magnetic cores; wherein the coils can be arranged with the respective winding axes radially extending from the axle or housing unit central axis, with the respective winding axes arranged in parallel or perpendicular to the axle or housing central axis, etc.), bars, or other electromagnetic element. The bars and/or coils can be aligned in parallel with the axle axis, perpendicular the axle axis, or otherwise arranged. In this variation, power is preferably transferred by way of time-varying magnetic fields, wherein time variation of the magnetic field in the static coupler induces current flow in the rotary coupler, which is used to power wheel end components. However, the power can be otherwise transferred. In a related variation, power is transferred by way of time-varying electric fields, wherein an alternating electric field in the static coupler or a portion thereof induces a time-varying displacement current and/or charge-separation in the rotary coupler, which is used to power wheel end components. In this related variation, the coil can be electrostatically coupled instead of inductively coupled to the rotary coupler.

The rotary coupler (rotary component) of the rotary joint functions to receive power from the static coupler, and to transfer the received power to wheel end components of the pressure management system 1100 (e.g., the pump 300, a secondary power source, etc.) on the opposite side of the stationary-rotating interface from the static coupler. The rotary coupler is preferably physically connected to the static coupler (e.g., at all times, intermittently, etc.), but can be otherwise configured. The rotary coupler is preferably arranged complementary to the static coupler (e.g., concentrically arranged, coaxially arranged, etc.), but can additionally or alternatively be otherwise suitably arranged relative to the static coupler (examples shown in FIG. 8 and FIG. 9). The rotary coupler is preferably mounted (e.g., statically mounted) to a component that rotates relative to the stationary vehicle component, but can alternatively be mounted to any suitable component. The rotary coupler is preferably mounted to the housing unit (e.g., housing unit exterior, wherein leads conduct the power through the housing thickness), but can alternatively be mounted to any suitable component.

Each rotary joint preferably includes a single rotary coupler, but can alternatively include multiple rotary couplers per rotary joint. Each rotary coupler is preferably paired with a static coupler but can alternatively interface with multiple static couplers (e.g., on the same rotary joint), or be otherwise configured. When the rotary joint includes multiple rotary couplers, the rotary couplers can be: arcuately aligned (e.g., along the axle cross section), axially aligned (e.g., stacked along the axle central axis), or otherwise arranged. The rotary coupler arrangement is preferably complimentary to the static coupler arrangement but can alternatively be different. The rotary coupler can trace the axle perimeter, extend from the axle perimeter (e.g., radially), extend along an arcuate segment of the axle perimeter, or be otherwise arranged or configured. When the rotary joint includes multiple rotary couplers, the individual rotary couplers are preferably electrically insulated from each other (e.g., by non-conductive material, by sheathing, etc.), but can alternatively be electrically connected. In one variation, each rotary coupler can include a surface contact, and be electrically connected to the power connector by leads or wires extending through the axle interior. In a second variation, each rotary coupler can be electrically connected to the power connector by leads or wires extending along the axle exterior. However, the rotary coupler can be otherwise arranged or configured.

In a first variation, the rotary coupler includes a collar affixed to an inner surface of the housing unit or hub (or other rotatable portion of the wheel assembly) that is coupled to the end of the axle 1450, that contacts a secondary conductive element (e.g., a brush) of the static coupler. The collar is preferably smooth but can additionally or alternatively define at least one brush that extends radially inward from the collar or electrical contact feature. The electrical contact feature can, in examples, continuously (e.g., via sliding) and/or discontinuously (e.g., intermittently) contact the conductive element of the rotary coupler in order to provide electrical contact between the static coupler and the rotary coupler. The conductive collar can trace the housing unit's inner arcuate surface (e.g., defined by a concave recess or through-hole in the housing unit), a broad face of the housing unit, or any other suitable portion of the housing unit.

In an example, the rotary coupler can be a hub bearing. In this example, the conductive collar can be arranged along the inner diameter of the hub's inner bearing race, wherein power (e.g., current) can optionally be transferred through the conductive hub bearing's rollers to the outer bearing race, wherein the outer bearing race is electrically connected to the remainder of the system through leads defined in the hub body (examples shown in FIG. 7 and FIG. 9). In a specific example, multiple serial bearings in the hub (e.g., stacked along the axle or hub axis) can be connected to different leads, and can supply different power (e.g., different current magnitude, phase; different voltage) to different system components. In this specific example, the bearings are preferably electrically isolated from each other by electrical isolation along the bearing broad faces, by grease, or by any other suitable electrical insulator. In this specific example, individual power connections (e.g., each bearing) can be individually indexed and controlled (e.g., by the on-vehicle control system, by the on-hub control system, etc.). In a second specific example, the bearings can be connected to the same electrical endpoint via the same or different electrical leads. In a third example, different arcuate segments of a given bearing can be connected to different electrical endpoints or leads. In this example, adjacent conductive rollers can be electrically insulated from each other by the cage (roller separator) or an intervening electrically insulative roller, or other electrical insulation. In this example, the inner and/or outer races can include conductive arcuate segments aligned with each (conductive) roller, and electrically insulated arguate segments aligned with each segment of electrical insulation (e.g., with each electrically insulative roller, etc.). However, a powered hub can be otherwise configured.

In a first example, the rotary joint includes a conductive fluid (e.g., mercury, a lubricant) that electrically couples the stationary and rotary couplers together to facilitate power transmission. In a second example, the rotary joint includes an optical emitter (e.g., a laser) and an optical receiver (e.g., an electro-optical power converter) that transmits power as light energy between the stationary and rotary couplers and converts the light energy to electrical energy at the optical receiver (e.g., arranged at the rotary coupler). In a third example, the rotary joint includes a sliding electrical transmission ring that remains in continuous contact as the rotary coupler rotates about the static coupler. In order to remain in continuous contact, ball bearings or conductive brushes can be used to aid in this regard.

The rotary coupler can be located on the housing unit exterior 1250 or the housing unit interior 1300 but can be otherwise located in order to provide power to the system. The rotary coupler can be arranged along the interior of a cavity defined by the housing unit 250 (e.g., along the arcuate surface of a recess or through-hole of the lumen in the housing), but can alternatively be arranged along the exterior of a protrusion extending from the housing (e.g., wherein the static coupler is concentric with and radially outward of the protrusion), along a planar surface of the housing exterior (e.g., along a housing broad face), or be otherwise arranged.

The power interface 450 can also optionally include one or more component connections that function to electrically connect all or a subset of the active system components to one or the primary power source 500 (e.g., via the rotary coupler). The component connections are preferably modular, wherein the modular component connections (e.g., pin connector, surface connectors, etc.) removably mount and electrically connect the respective component to the housing and/or rotary coupler, respectively. However, the component connections can alternatively be substantially permanent (e.g., wherein removal results in permanent component destruction; wired; etc.), electromagnetic, or otherwise connected. The component connections are preferably located within the housing interior, but can alternatively extend entirely or partially along the housing exterior. The component connections preferably extend radially from the rotary coupler, but can alternatively extend arcuately along the rotary coupler, extend along the length of the rotary coupler, or be otherwise configured. Multiple component connections can be arranged in the same plane, in different planes (e.g., intersecting the rotary coupler rotational axis), along the same axis, along different axes, aligned, offset, or otherwise arranged.

In a first variation, the component connections are arcuately arranged in the same plane. In a second variation, the component connections are radially arranged, such that the component connections share the same center (concentric arrangement). In a third embodiment, the component connections are axially arranged (e.g., coaxially stacked along rotary axis of a wheel on a vehicle 200).

In a second variation, the component connections include wireless connections, wherein the component includes an induction coil complimentary to the component connection. In this variation, a segment of the interface can form an arcuate segment, and/or it can cooperatively form a system-side interface with a remainder of components.

However, the power interface 450 can additionally or alternatively include any suitable means of sourcing and transferring power (e.g., electrical power, mechanical power) from the primary power source 500 to a stationary (e.g., not rotating with the wheel) surface proximal the wheel end 850.

The power interface 450 can optionally include one or more connections to electrical ground. In one variation, the vehicle-side components (e.g., power connector, power control systems, static coupler) can use the vehicle frame, body, or any other suitable vehicle component as electrical ground. In a second variation, the rotary-side components (e.g., systems on-board the wheel-end rotary system, such as local control systems, pump(s), sensor(s), rectifier(s), local power management systems, PMICs, PMUs, etc.) can use the axle (e.g., unpowered portions of the axle; portions of the axle electrically isolated from the power connectors; etc.), brake drum, or any other suitable component as electrical ground, wherein the rotary-side components can include electrical leads extending through the housing unit thickness to electrically connect with the grounding component.

The pressure management system 1100 can optionally include a secondary power source that functions to store power at the wheel end 850 (e.g., at the rotating side of the stationary-rotating interface). The secondary power source can store electrical energy (e.g., as a battery) and/or mechanical energy (e.g., as a flywheel, as a spring, etc.), and provide the stored energy to the pump 300 and/or any other components of the pressure management system 1100 that require power and are arranged at the wheel end 850. The secondary power source can function to provide backup power in the event of primary power source failure, consistent power in the event of primary power source intermittency, and/or have any other suitable function. In a first specific example, the secondary power source includes a battery that receives and stores power from the power interface 450 and is electrically coupled to the pump 300 and the control system 600 at the wheel end 850 (e.g., and provides electrical power thereto).

The fluid connector 550 functions to fluidly connect the system to a pressurized container 950, such as tires in a dual tire assembly 150 on a vehicle 200. This connector preferably connects the pressurized reservoir 350 of the system to one or more tires, but it can alternatively directly connect the chamber 1550 of the pump 300 to one or more tires as shown in FIG. 3. As a result of this connection, the fluid connector 550 can provide controlled passageway to pressurize or depressurize any or all of the tires with which it is in fluid contact. This fluid connector 550 can include one or more hoses and valves that can aid in the controlled passageway of fluid through the fluid connector 550. The system can have one tube and one valve, but it alternatively can have a plurality of either tubes and/or valves. Because the fluid connector 550 functions to fluidly connect pressurized containers (e.g., tires) with the pump 300, a subset of the fluid connector 550 can be found within the housing unit interior 1300 and another subset can be found in the housing unit exterior 1250. However, any other suitable location combination can work. The operating modes of the fluid connector 550 are configured to open and close for each individual connector when there is a plurality of fluid connectors for a dual tire assembly 150. In the open mode, the connector allows the pressurized reservoir 350 and the pressurized container 950 to begin to reach pressure equilibrium with each other. When the fluid connector 550 is operating in the closed mode, then the pressurized reservoir 350 and the pressurized container 950 are no longer fluidly connected. The fluid connector 550 can also aid to relieve pressure from the pressurized container 950 or the pressurized reservoir 350 by releasing fluid into the surrounding atmosphere. By switching among different modes which can include the open and closed modes, the fluid connector 550 can selectively connect the pressurized container 950 to the pressurized reservoir 350. This switching can occur during operation of a vehicle 200 (static or in motion) when the pressure management system 1100 is a pressure management system for a dual tire assembly 150 on a vehicle 200. Active switching can help optimally manage the pressure management system 1100 to ensure that the fluid in the pressurized container 950 is within a target pressure range 900. This active switching between modes can be controlled through received data from the plurality of sensors 400 and user input data. When used in a dual tire assembly 150, each of the tire pressures can be controlled through two independently active switching valves.

The valve 1800 of the fluid connector 550 serves to fluidly connect at least two pressurized volumes. The valve 1800 is preferably powered by the primary power source (e.g., via the rotary coupler), but can alternatively be otherwise powered. The valve 1800 is preferably controlled by the control system, but can alternatively be powered by a local control system or by any other suitable system. In a first variation, the valve 1800 is an active valve or electrically controlled valve (e.g., a solenoid), which allows controlled flow of fluids based on a received signal (e.g., a signal from the control system 600). In a second variation, the valve 1800 is a passive valve. This valve 1800 can allow for flow based on a predetermined pressure gradient between the two volumes that are connected. In one embodiment, the passive valve is a check valve that allows for only one-way flow. In a second embodiment, the passive valve is a bidirectional valve that allows for two-way flow.

The plurality of sensors 400 of the pressure management system 1100 functions to detect at least one operating characteristic of the pressure management system 1100 (e.g., vehicle characteristics, tire characteristics, the pressure in the tire, the pressure at any point along the flow path between the fluid source and the reservoir, the ambient temperature, the temperature of any component of the pressure management system 1100, the vibrations tires can experience, the road conditions that tires drive on, the ambient humidity, etc.). Examples of sensors that can be used can include: orientation/vibration sensors (e.g., accelerometers, gyroscopes, altimeters), temperature sensors, pressure sensors, flow sensors, or any other suitable type of sensor. The sensors can preferably be connected to the control system 600, or otherwise integrated into the system. In a specific example, a first subset of this plurality of sensors 400 can be mounted to and/or monitor the housing unit 250 or components thereof (e.g., the pressurized reservoir), and a second subset of the plurality of sensors 400 can monitor the tire. When the wheel end includes multiple tires, the plurality of sensors can optionally include a third subset of sensors, or monitor the auxiliary tires using the second subset of sensors.

The sensors preferably sample signals (e.g., measurements) indicative of the operation parameters, but can be otherwise used. The signals can be sampled at a predetermined frequency, upon occurrence of a sampling event (e.g., in response to a sampling instruction received from a control system 600), or sampled at any suitable time. The resultant data (e.g., raw signals, measurement values, etc.) can be transferred to the control system 600, and/or any other suitable endpoint through the communications system.

The plurality of sensors 400 preferably include two or more sensors for each tire at the wheel end 850, but can alternatively include fewer sensors. In some embodiments, each pressure management system 1100 includes at least two pressure sensors, but can alternatively have any suitable number and combination of sensors as shown in FIG. 3. This plurality of sensors 400 can be electrically connected to the power interface 450 or to the control system 600 (e.g., via the component connections), or to any suitable source of power. The sensors can be located within the housing unit interior 1300, outside of the housing unit exterior 1250, or located in any suitable a location.

The pressure sensor 1850 of the plurality of sensors 400 functions to detect the pressure of a fluid. The pressure sensor 1850 can optionally include one or more pressure sensors. The pressure sensor can be connected to the tire and/or the pressurized reservoir 350 in the pressure management system 1100. In one variation, the pressure sensor is an absolute pressure sensor, which measures fluid pressure against the baseline of a perfect vacuum. In a second variation, the pressure sensor 1850 is a gauge pressure sensor, which measures fluid pressure compared with ambient atmosphere. However, any suitable pressure system can be used.

The plurality of sensors 400 can optionally include one or more vibration sensors. The vibration sensor of the plurality of sensors 400 functions to measure the mechanical wear of the pressure management system 1100 from vibrations. The vibration sensor is preferably mechanically connected to the tires on the wheel end 850, but can alternatively or additionally be statically mounted to the housing unit 250. The vibration sensor can be any suitable sensor that detects movement (e.g., an accelerometer, a velocity sensor, a displacement sensor, etc.).

The plurality of sensors 400 can optionally include one or more temperature sensors. The temperature sensor of the plurality of sensors 400 functions to measure ambient temperature, tire temperature, and/or fluid temperature. The temperature sensor can be mounted within the housing unit interior 1300, within the pressurized reservoir 350, within the tires of a dual tire system, or outside any of the aforementioned elements. The temperature sensors can be a negative temperature coefficient thermistor, a resistance temperature detector, a thermocouple, a semiconductor-based sensor, or any other suitable temperature sensor.

However, the system can include any suitable set of module(s) mounted to the housing unit and electrically and/or communicably connected to the primary power source and/or central controller, respectively.

Figure 5:
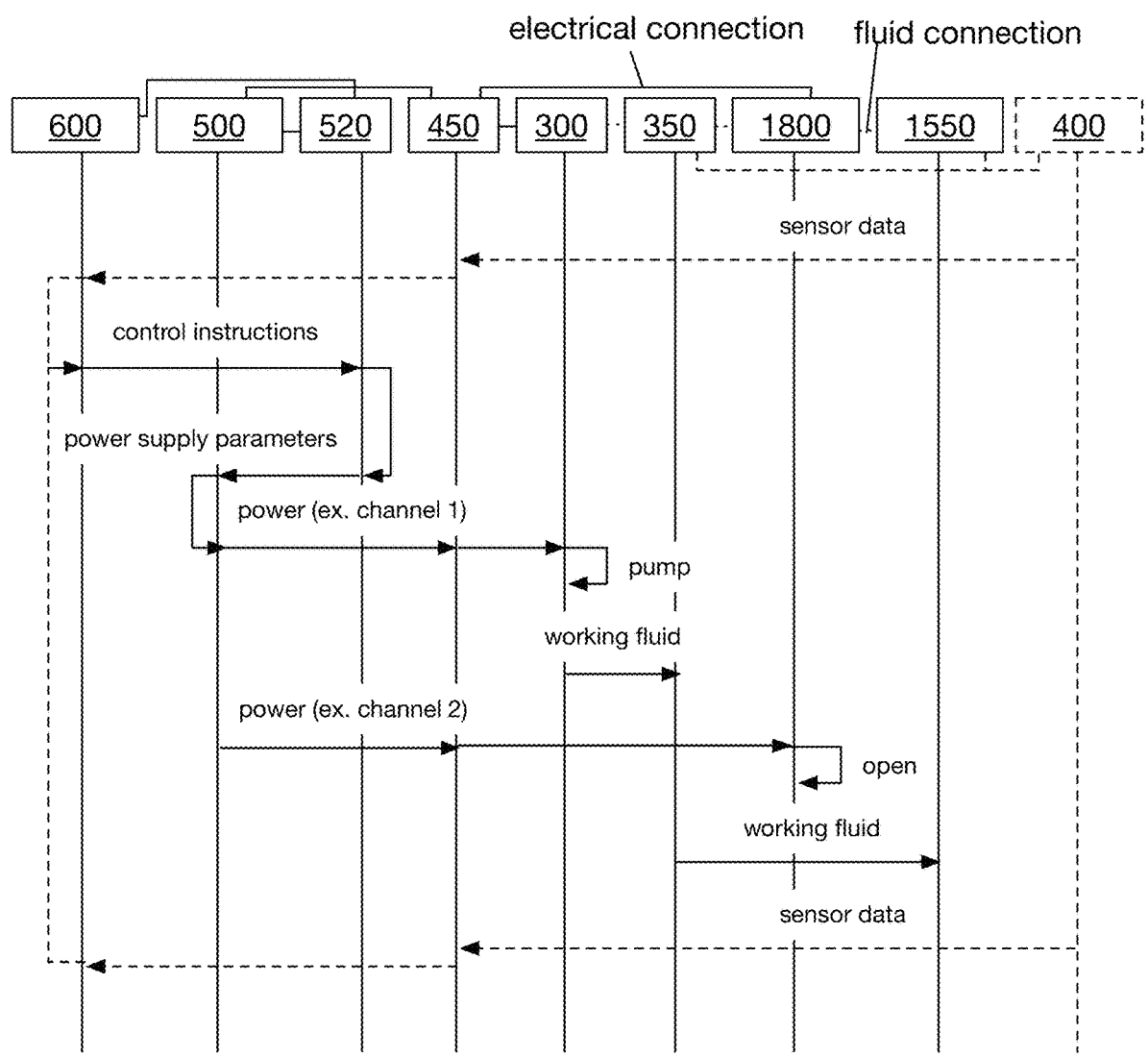
FIG. 5 is an example of system operation.

The system can optionally include a control system 600 that functions to control the pump 300 (or pumps), receive data from one or more plurality of sensors 400, and/or determine operating instructions 650; example shown in FIG. 5. For example, the control system 600 can calculate a target pressure range 900, using signals sampled by the wheel-end sensors to create individual operating instructions 650 for each tire (e.g., the local tire that the control system 600 is mounted to; multiple tires on the vehicle 200; etc.). The control system 600 preferably determines operating instructions 650 for a given wheel-end based on sensor measurements from the respective wheel-end, but can alternatively or additionally determine operating instructions 650 for given wheel-end based on sensor measurements from multiple wheel-ends.

The control system 600 can also function to generate and provide notifications to a user of the pressure management system 1100. However, the control system 600 can have any other suitable function. The control system 600 can include one or more vehicle controllers (e.g., central controller), remote computing systems, a user devices (e.g., a mobile device associated with a vehicle operator or other entity that interacts with the pressure management system 1100), and/or any other suitable component(s) usable for system control. The control system can be an ECU, microprocessor, a GPU, or any other suitable processing system. The control system 600 is preferably remote from the wheel-end system (e.g., on-board the vehicle), but can be otherwise located. The control system 600 is preferably connected to the power management system and/or primary power source, but can be otherwise connected to any suitable component.

The control system 600 can optionally operate the pump 300 between various operating modes including at least a standby mode, a pumping mode, and/or a compression mode. In the standby mode, the pump 300 preferably does not pump fluid into the pressurized reservoir 350 (e.g., the pump 300 is off, the pumped fluid is released directly to the ambient environment, etc.). In the standby mode, the pump 300 can be disconnected from the primary power source 500 entirely (e.g., by inactivating the power interface 450), but can additionally or alternatively remain connected to the primary power source 500 and actively controlled to remain in an off state (e.g., not pumping or compressing). In the pumping mode, the pump 300 can be transferring fluid into the pressurized reservoir 350 and/or the pressurized container 950 (e.g., the tire). In the compression mode, the pump 300 can be compressing fluid received from a fluid source at a lower pressure (e.g., the ambient environment) than the pressurized reservoir 350 (e.g., the tire) and transferring the compressed fluid into the pressurized reservoir 350 and/or tire. The compression mode can include compressing the fluid to any suitable pressure. The pressure of the fluid after compression is preferably controllable (e.g., by adjusting pump parameters such as compression length, by adjusting downstream flow path parameters such as pressure bleed valve operation, etc.), but can additionally or alternatively be fixed and/or not controllable or adjustable.

The control system can determine operating instructions can before and/or during active use of the vehicle 200. In a first variation, operating instructions 650 are calculated at the beginning of the vehicle operation initiation (e.g., based on the route parameters, such as traffic, grade, or road roughness; ambient environment parameters; or other driving parameters). In a second variation, the operating instructions 650 are determined during operation of the vehicle 200 (e.g., based on signals sampled by the sensors on-board the wheel-end pressure management system). In a first example, the operating instructions 650 are calculated based on the sensor measurements. In a second example, the operating instructions 650 are selected based on the sensor measurements. In a third example, the instructions are generated in response to the sensor measurements satisfying an operation event (e.g., the sensor measurement value exceeding or falling below a predetermined threshold value). However, the operating instructions 650 can be otherwise determined.

The target pressure range 900 (target pressure range) of the control system 600 is preferably determined based on data from the plurality of sensors 400 and/or user input 1000, but can alternatively or additionally be determined based on ambient environment data, historic data (e.g., historic operation data), route data, predictive data, target suspension operation parameters, and/or any other suitable data. The target pressure range can be: a predetermined pressure range (e.g., for a combination of operation parameter values), an optimal operating range (e.g., to optimize for one or more operation parameters, such as tire lifetime), or be any other suitable target pressure range. The target pressure range (target pressure range 900) can be an optimal pressure range (e.g., optimized for one or more tire parameters, such as tire lifetime, wear, etc.; system operation parameters, such as energy consumption, etc.; or any other suitable vehicle operation parameter), be heuristically determined, be calculated, be determined using a neural network, or be otherwise determined.

The target pressure range is preferably determined for each individual tire, but can alternatively be determined for the vehicle 200 as a whole, for an axle 1450, or for any suitable set of tires. The target pressure range can subsequently be used to determine individual operating instructions for each wheel-end pressure management system (and/or the primary power supply), which can be selectively controlled to add or release pressure from each one of the tires. In one variation, the operating instructions 650 can include the amount of power provided to each pressure management system (e.g., wherein the supplied power or current is associated with a predetermined pumping parameter, such as duration or pressure), wherein the operating instructions can be supplied to the power management system(s) for execution. In a second variation, the operation instructions can include the target pressure range, wherein the local control systems (e.g., at each pressure management system) executes the control instructions to control the respective local components (e.g., controls the motor controller of the pump or the active valve to pull a specified amount of power for a specified amount of time).

The communication system 750 of the pressure management system 1100 functions to send and/or receive data to and/or from the wheel end 850 (e.g., to and from active components at the wheel end 850) and an endpoint. The endpoint is preferably the control system 600, but can be a gateway or access point (e.g., in the vehicle cab), a remote computing system, or any suitable endpoint. The communication system 750 is preferably wired, but can be otherwise configured. The communication system 750 can transmit data across the stationary-rotating interface (e.g., the power interface 450, a second interface) to the endpoint, wirelessly transmit data to the endpoint, or otherwise communicate data to the endpoint. The data routed by the communication system 750 can include operating instructions 650, or any other suitable data.

In a first variation, the communication system 750 is integral with the power interface 450 and modulates the power signal (e.g., the power that is transferred over the power connector) to encode data. In a specific example of the first variation, the power interface 450 performs inductive power transfer between the static coupler and the rotary coupler, and the inductance of at least one of the static coupler and the rotary coupler is modulated (e.g., by digitally controlling the continuity between a plurality of closed loops to change the effective inductance) according to a data transmission protocol, using the power transfer signal as a carrier wave.

In a second variation, the communication system 750 is distinct from the power interface 450 and transmits and receives data in any suitable manner. In For example, the communication system 750 can include a second rotary electrical joint and data connector adjacent to and electrically insulated from the rotary electrical joint and power connector for the power interface, respectively. In this example, the second rotary electrical joint can be have one of the configurations described above for the rotary electrical joint, or be otherwise configured.

In a first example of communication system variation operation, the communication system transmits a single data packet at any given time across the rotary electrical joint (e.g., from the wheel-end system to the centralized system(s) or vice versa), and may or may not wait for packet receipt confirmation before transmitting the next packet. In a second example of communication system variation operation, the communication system can transmit the data packet when the wheel is stationary (e.g., not rotating relative to the axle). In a third example communication system variation operation, multiple packets can be concurrently transmitted through different communication channels, wherein the second rotary electrical joint can define multiple electrically isolated electrical and/or data paths.

Although omitted for conciseness, the preferred embodiments include every combination and permutation of the various system components and the various method processes, wherein the method processes can be performed in any suitable order, sequentially or concurrently.

As a person skilled in the art will recognize from the previous detailed description and from the figures and claims, modifications and changes can be made to the preferred embodiments of the pressure management system 1100 without departing from the scope defined in the following claims.

I claim:

1. A pressure management system, comprising:
   a dual wheel assembly mounted to a wheel hub, the dual wheel assembly comprising an inboard tire and an outboard tire;
   a wheel-end inflation system mounted at a wheel-end of the wheel hub along an exterior face of the dual wheel assembly, the wheel-end inflation system comprising:
   a housing arranged radially inward of the outboard tire and mounted to the wheel end inboard of a sidewall of the outboard tire;
   a pressurized fluid source arranged within the housing and fluidly connected to the inboard and outboard tires with a first and second hose, respectively;

a rotary electrical joint statically connected to the housing and physically electrically connecting the pressurized fluid source to a vehicle power source; and
a set of sensors; and
a controller electrically connected to the vehicle power source and communicatively coupled to the set of sensors, the controller configured to:
automatically generate control instructions for the pressurized fluid source based on sensor data from the set of sensors; and
based on the control instructions, directly control the vehicle power source to provide power to the pressurized fluid source via the rotary electrical joint.

2. The pressure management system of claim 1, wherein the controller is configured to automatically generate the control instructions to independently regulate the pressure of the inboard and outboard tires.

3. The pressure management system of claim 1, wherein the controller is configured to automatically determine a target pressure range, individually, for each of the inboard and outboard tires, wherein the control instructions are generated based on the target pressure ranges.

4. The pressure management system of claim 3, wherein the controller is communicatively connected to a vehicle CAN bus, wherein the target pressure range is automatically determined based on historical operation data and ambient temperature data, wherein the historical operation data is determined based on vehicle CAN data.

5. The pressure management system of claim 1, wherein the rotary electrical joint comprises a plurality of electrically isolated paths.

6. The pressure management system of claim 5, wherein the electrically isolated paths of the plurality are configured to concurrently transmit signals between the vehicle and the wheel-end inflation system.

7. The pressure management system of claim 1, wherein the controller comprises a centralized controller which is statically mounted onboard a vehicle body and a wheel-end controller arranged within the housing of the wheel-end inflation system.

8. The pressure management system of claim 1, wherein the rotary electrical joint comprises a slip ring electrical connector or an inductive electrical coupling.

9. The pressure management system of claim 1, wherein the hub rotatably mounts the tires to a stationary axle, wherein the rotary electrical joint comprises:
a static coupler statically mounted to the stationary axle; and
a rotary coupler statically mounted to the hub.

10. The pressure management system of claim 9, wherein the rotary coupler comprises a hub bearing.

11. The pressure management system of claim 1, wherein the rotary electrical joint is coaxial with and is rotatable about an axis of wheel rotation and is arranged radially inward of the exterior face of the outboard tire.

12. The pressure management system of claim 1, wherein the pressurized fluid source comprises a set of active valves controlling fluid flow through the first and second hoses, wherein the set of active valves is electrically connected to the vehicle power source.

13. The pressure management system of claim 12, wherein the pressurized fluid source further comprises a pressurized reservoir, wherein the pressurized reservoir is fluidly connected to the inboard and outboard tires through the set of active valves.

14. The pressure management system of claim 13, wherein the pressurized fluid source further comprises a pump which is electrically connected to the vehicle power source, via the electrical joint, independently of the set of active valves.

15. The pressure management system of claim 14, wherein the pump is configured to operate concurrently with power provision via the rotary electrical joint, with the vehicle in a stationary configuration.

16. A pressure management system, comprising:
a housing configured to mount to a wheel end and against an outboard, exterior face of a wheel which mounts a tire;
a pressurized fluid source arranged within the housing and fluidly connected to the tire, the pressurized fluid source comprising a pump mounted to the housing;
a rotary electrical joint arranged along an inboard side of the housing and coaxial with an axis of wheel rotation, the rotary electrical joint comprising a rotary coupler mechanically coupled to the housing at an inboard end and a stationary coupler mechanically coupled to a non-rotating component of an axle at an outboard end, wherein the rotary coupler is in physical contact with the stationary coupler, wherein the rotary electrical joint is configured to electrically connect the pump and a set of electrically-powered components within the housing to an onboard vehicle power source via different electrically isolated paths;
a set of sensors located at the wheel end;
control instructions being automatically generated based on data from the sensors; and
a controller configured to directly control the onboard vehicle power source based on the control instructions to provide power to the pressurized fluid source via the rotary electrical joint.

17. The pressure management system of claim 16, wherein:
the controller comprises a central vehicle controller communicatively coupled to the set of sensors via the rotary electrical joint;
the central vehicle controller is connected to a vehicle CAN bus and a vehicle power source; and
the central vehicle controller is configured to automatically generate control instructions for the pressurized fluid source to regulate the pressure of the tire based on: sensor data collected with the set of sensors, and historical vehicle operation data from the set of sensors and the vehicle CAN bus.

18. A decentralized tire inflation system for a vehicle, comprising:
a vehicle power source;
a plurality of independently-controllable, wheel-end pressurization systems, each configured to operate based on vehicle operation data from a vehicle CAN bus and using power from the vehicle power source, each comprising:
a housing configured to mount to a respective wheel end of the vehicle against an outboard, exterior face of a respective wheel which mounts a respective tire;
a pressurized fluid source arranged within the housing and fluidly connected to the tire, the pressurized fluid source comprising a pump mounted to the housing; and
a rotary electrical joint arranged along an inboard side of the housing and coaxial with an axis of wheel rotation, the rotary electrical joint comprising a rotary coupler mechanically coupled to the housing at an inboard end and a stationary coupler mechanically coupled to a non-rotating component of an axle at an outboard end, wherein the rotary coupler is in physical contact with the stationary coupler, wherein the rotary electrical joint is configured to electrically connect the pump and a set of electrically-powered wheel-mounted components to the vehicle power source via different electrically isolated paths;

a set of sensors located at a respective wheel end;

control instructions being automatically generated based on data from the sensors; and a controller configured to directly control the vehicle power source based on the control instructions to provide power to the pressurized fluid source of a wheel-end pressurization system of the plurality of independently controllable, wheel-end pressurization systems via the rotary electrical joint of the wheel-end pressurization system.

19. The decentralized tire inflation system of claim 18, wherein each independently-controllable, wheel-end pressurization system further comprises a pump controller arranged within the housing, which is configured to control the pump.

20. The decentralized tire inflation system of claim 19, wherein the controller is configured to control the pump concurrently with receiving a power provision via the rotary electrical joint, with the vehicle in a stationary configuration.

* * * * *